US012381789B2

(12) United States Patent
Raghavan et al.

(10) Patent No.: US 12,381,789 B2
(45) Date of Patent: Aug. 5, 2025

(54) TECHNIQUES FOR REPORTING CORRELATION METRICS FOR MACHINE LEARNING REPRODUCIBILITY

(71) Applicant: QUALCOMM Incorporated, San Diego, CA (US)

(72) Inventors: Vasanthan Raghavan, West Windsor Township, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 18/045,614

(22) Filed: Oct. 11, 2022

(65) Prior Publication Data
US 2024/0121165 A1 Apr. 11, 2024

(51) Int. Cl.
H04L 12/00 (2006.01)
H04L 41/16 (2022.01)
H04W 24/10 (2009.01)

(52) U.S. Cl.
CPC .............. H04L 41/16 (2013.01); H04W 24/10 (2013.01)

(58) Field of Classification Search
CPC .. H04L 41/16; H04W 24/10; H04W 28/0231; G06N 3/0442; G06N 5/01; G06N 7/01; G06N 3/098; G06N 20/00
USPC ........................................................ 370/252
See application file for complete search history.

(56) References Cited

U.S. PATENT DOCUMENTS

| 11,836,595 | B1* | 12/2023 | Yang | .................... G06N 3/082 |
| 2022/0167236 | A1* | 5/2022 | Melodia | ................ H04W 28/24 |
| 2022/0393781 | A1 | 12/2022 | Kim et al. | |

FOREIGN PATENT DOCUMENTS

| CN | 110831029 A | 2/2020 |
| CN | 112152948 A | 12/2020 |
| WO | WO-2021112360 A1 | 6/2021 |

OTHER PUBLICATIONS

International Search Report and Written Opinion—PCT/US2023/031277—ISA/EPO—Nov. 29, 2023.

* cited by examiner

Primary Examiner — Frantz Coby
(74) Attorney, Agent, or Firm — Holland & Hart LLP

(57) ABSTRACT

Methods, systems, and devices for wireless communication are described. A machine learning server may generate a low-dimensional parameter set representing training data for the machine learning server, the training data being associated with one or more communication environments or one or more channel environments, or a combination thereof. The machine learning server may receive, from one or more devices within a communication environment or within a channel environment, or both, a low-dimensional parameter set representing testing data associated with the communication environment or the channel environment, or both. The machine learning server may generate a reproducibility metric according to a correlation between the parameter set representing the training data and the parameter set representing the testing data. The machine learning server may transmit a message indicating the reproducibility metric to the one or more devices, and the one or more devices may perform communication procedures based on the reproducibility metric.

30 Claims, 13 Drawing Sheets

TECHNIQUES FOR REPORTING CORRELATION METRICS FOR MACHINE LEARNING REPRODUCIBILITY

FIELD OF TECHNOLOGY

The following relates to wireless communication, including techniques for reporting correlation metrics for machine learning reproducibility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for reporting correlation metrics for machine learning reproducibility. For example, the described techniques provide for a machine learning server to generate a parameter set (e.g., a low-dimensional parameter set) representing training data used by the machine learning server, the training data being associated with one or more communication environments or one or more channel environments, or a combination thereof. The machine learning server may receive, from one or more devices within an environment (e.g., a communication environment or a channel environment, or both), a parameter set (e.g., another low-dimensional parameter set) representing testing data associated with the communication environment or the channel environment, or both. The machine learning server may generate a reproducibility metric according to a correlation between the parameter set representing the training data and the received parameter set representing the testing data. The reproducibility metric may be associated with a confidence value for predictions generated by the machine learning server. The machine learning server may transmit a message indicating the reproducibility metric to the one or more devices.

Upon receiving a message indicating the reproducibility metric, a device (e.g., a user equipment (UE), a network node) may determine whether to utilize information and predictions provided by the machine learning server for communicating in a communication environment or channel environment. For example, in cases where the reproducibility metric satisfies a threshold, there may be some correlation between the parameter set representing the training data and the parameter set representing the testing data, which may enable relatively accurate machine learning-based predictions for determining communications parameters in the communication or channel environment. In other examples, if the reproducibility metric does not satisfy a threshold, one or more devices located in in the communication or channel environment may instead rely on their own measurements and/or estimates for determining communications parameters (e.g., until retraining is performed to update the training data).

An apparatus for wireless communications at a machine learning server is described. The apparatus may include a processor, memory coupled with the processor, and instructions stored in the memory. The instructions may be executable by the processor to cause the apparatus to generate a first set of parameters representing training data, the training data corresponding to one or more communication environments or one or more channel environments, or a combination thereof, where the first set of parameters has a reduced dimensionality with respect to a dimensionality of the training data, receive, from one or more devices, one or more messages indicating a second set of parameters representing testing data, the testing data corresponding to a communication environment or a channel environment, or both, where the second set of parameters has a reduced dimensionality with respect to a dimensionality of the testing data, and transmit, to the one or more devices, a message indicating a reproducibility metric for the communication environment or the channel environment, or both, the reproducibility metric being based on a correlation between the first set of parameters and the second set of parameters.

A method for wireless communications at a machine learning server is described. The method may include generating a first set of parameters representing training data, the training data corresponding to one or more communication environments or one or more channel environments, or a combination thereof, where the first set of parameters has a reduced dimensionality with respect to a dimensionality of the training data, receiving, from one or more devices, one or more messages indicating a second set of parameters representing testing data, the testing data corresponding to a communication environment or a channel environment, or both, where the second set of parameters has a reduced dimensionality with respect to a dimensionality of the testing data, and transmitting, to the one or more devices, a message indicating a reproducibility metric for the communication environment or the channel environment, or both, the reproducibility metric being based on a correlation between the first set of parameters and the second set of parameters.

Another apparatus for wireless communications at a machine learning server is described. The apparatus may include means for generating a first set of parameters representing training data, the training data corresponding to one or more communication environments or one or more channel environments, or a combination thereof, where the first set of parameters has a reduced dimensionality with respect to a dimensionality of the training data, means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data, and means for transmitting, to the one or more devices, a message indicating a reproducibility metric for the communication environment or the channel environment, or both, the reproducibility metric being based on a correlation between the first set of parameters and the second set of parameters.

A non-transitory computer-readable medium storing code for wireless communications at a machine learning server is described. The code may include instructions executable by a processor to generate a first set of parameters representing training data, the training data corresponding to one or more communication environments or one or more channel environments, or a combination thereof, where the first set of parameters has a reduced dimensionality with respect to a dimensionality of the training data, receive, from one or more devices, one or more messages indicating a second set of parameters representing testing data, the testing data corresponding to a communication environment or a channel environment, or both, where the second set of parameters has a reduced dimensionality with respect to a dimensionality of the testing data, and transmit, to the one or more devices, a message indicating a reproducibility metric for the communication environment or the channel environment, or both, the reproducibility metric being based on a correlation between the first set of parameters and the second set of parameters.

In some examples of the method, apparatuses, and non-transitory computer-readable medium described herein, the reproducibility metric indicates, to the one or more devices, to perform one or more communication procedures according to one or more predictions from a machine learning model generated by the machine learning server using the training data, the reproducibility metric indicating to perform the one or more communication procedures based on the reproducibility metric satisfying a threshold value.

In some examples of the method, apparatuses, and non-transitory computer-readable medium described herein, the reproducibility metric indicates, to the one or more devices, to perform one or more communication procedures according to one or more measurements performed by the one or more devices, the reproducibility metric indicating to perform the one or more communication procedures based on the reproducibility metric failing to satisfy a threshold value.

In some examples of the method, apparatuses, and non-transitory computer-readable medium described herein, the reproducibility metric indicates a confidence value associated with predictions from a machine learning model generated by the machine learning server using the training data applied to the communication environment.

In some examples of the method, apparatuses, and non-transitory computer-readable medium described herein, the predictions from the machine learning model generated by the machine learning server include a beam weight prediction for a non-blockage scenario or a blockage scenario.

Some examples of the method, apparatuses, and non-transitory computer-readable medium described herein may further include operations, features, means, or instructions for generating the reproducibility metric based on the correlation between the first set of parameters and the second set of parameters.

In some examples of the method, apparatuses, and non-transitory computer-readable medium described herein, generating the reproducibility metric may include operations, features, means, or instructions for generating the reproducibility metric based on a correlation between one or more principal components associated with the training data and one or more principal components associated with the testing data, where the first set of parameters includes the one or more principal components associated with the training data, and where the second set of parameters includes the one or more principal components associated with the testing data.

Some examples of the method, apparatuses, and non-transitory computer-readable medium described herein may further include operations, features, means, or instructions for generating additional training data for the one or more communication environments or the one or more channel environments, or a combination thereof, based on the reproducibility metric failing to satisfy a threshold value.

In some examples of the method, apparatuses, and non-transitory computer-readable medium described herein, the training data includes an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

In some examples of the method, apparatuses, and non-transitory computer-readable medium described herein, the testing data includes an indication of at least one of a quantity of clusters in the communication environment or channel environment, or both, a quantity of reflectors in the communication environment or channel environment, or both, a quantity of diffraction points in the communication environment or channel environment, or both, positioning information associated with the one or more devices, an antenna module capability, a quantity of antenna modules, a placement of antenna modules, a beamforming capability of the one or more devices, or a beam measurement capability of the one or more devices.

In some examples of the method, apparatuses, and non-transitory computer-readable medium described herein, the machine learning server may be part of a UE or part of a network entity, or includes an independent node associated with a set of multiple devices in a network.

An apparatus for wireless communications at a first device is described. The apparatus may include a processor, memory coupled with the processor, and instructions stored in the memory. The instructions may be executable by the processor to cause the apparatus to generate a second set of parameters representing testing data, the testing data corresponding to a communication environment or a channel environment, or both, where the second set of parameters has a reduced dimensionality with respect to a dimensionality of the testing data, transmit, to a machine learning server, a first message indicating the second set of parameters representing the testing data, and receive a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

A method for wireless communications at a first device is described. The method may include generating a second set of parameters representing testing data, the testing data corresponding to a communication environment or a channel environment, or both, where the second set of parameters has a reduced dimensionality with respect to a dimensionality of the testing data, transmitting, to a machine learning server, a first message indicating the second set of parameters representing the testing data, and receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

Another apparatus for wireless communications at a first device is described. The apparatus may include means for generating a second set of parameters representing testing data, the testing data corresponding to a communication environment or a channel environment, or both, where the second set of parameters has a reduced dimensionality with respect to a dimensionality of the testing data, means for transmitting, to a machine learning server, a first message indicating the second set of parameters representing the testing data, and means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

A non-transitory computer-readable medium storing code for wireless communications at a first device is described. The code may include instructions executable by a processor to generate a second set of parameters representing testing data, the testing data corresponding to a communication environment or a channel environment, or both, where the second set of parameters has a reduced dimensionality with respect to a dimensionality of the testing data, transmit, to a machine learning server, a first message indicating the second set of parameters representing the testing data, and receive a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

In some examples of the method, apparatuses, and non-transitory computer-readable medium described herein, the reproducibility metric indicates to perform one or more communication procedures according to one or more predictions from a machine learning model generated by the machine learning server using the training data, the reproducibility metric indicating the first device to perform the one or more communication procedures based on the reproducibility metric satisfying a threshold value.

In some examples of the method, apparatuses, and non-transitory computer-readable medium described herein, the reproducibility metric indicates to perform one or more communication procedures according to one or more measurements performed by the first device, the reproducibility metric indicating the first device to perform the one or more communication procedures based on the reproducibility metric failing to satisfy a threshold value.

In some examples of the method, apparatuses, and non-transitory computer-readable medium described herein, the reproducibility metric indicates a confidence value associated with predictions from a machine learning model generated by the machine learning server using the training data applied to the communication environment or the channel environment, or both.

In some examples of the method, apparatuses, and non-transitory computer-readable medium described herein, the predictions from the machine learning model generated by the machine learning server associated with the training data include a beam weight prediction for a non-blockage scenario or a blockage scenario.

Some examples of the method, apparatuses, and non-transitory computer-readable medium described herein may further include operations, features, means, or instructions for receiving, from a second device within the communication environment or the channel environment, or both, a message indicating one or more parameters, where generating the second set of parameters may be based on receiving the message indicating the one or more parameters.

Some examples of the method, apparatuses, and non-transitory computer-readable medium described herein may further include operations, features, means, or instructions for transmitting, to a second device within the communication environment or the channel environment, or both, a message indicating the reproducibility metric based on receiving the reproducibility metric.

In some examples of the method, apparatuses, and non-transitory computer-readable medium described herein, the testing data includes an indication of at least one of a quantity of clusters in the communication environment or the channel environment, or both, a quantity of reflectors in the communication environment or the channel environment, or both, a quantity of diffraction points in the communication environment or the channel environment, or both, positioning information associated with the first device, an antenna module capability, a quantity of antenna modules, a placement of antenna modules, a beamforming capability of the first device, or a beam measurement capability of the first device.

In some examples of the method, apparatuses, and non-transitory computer-readable medium described herein, the training data includes an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

DETAILED DESCRIPTION

Figure 1:
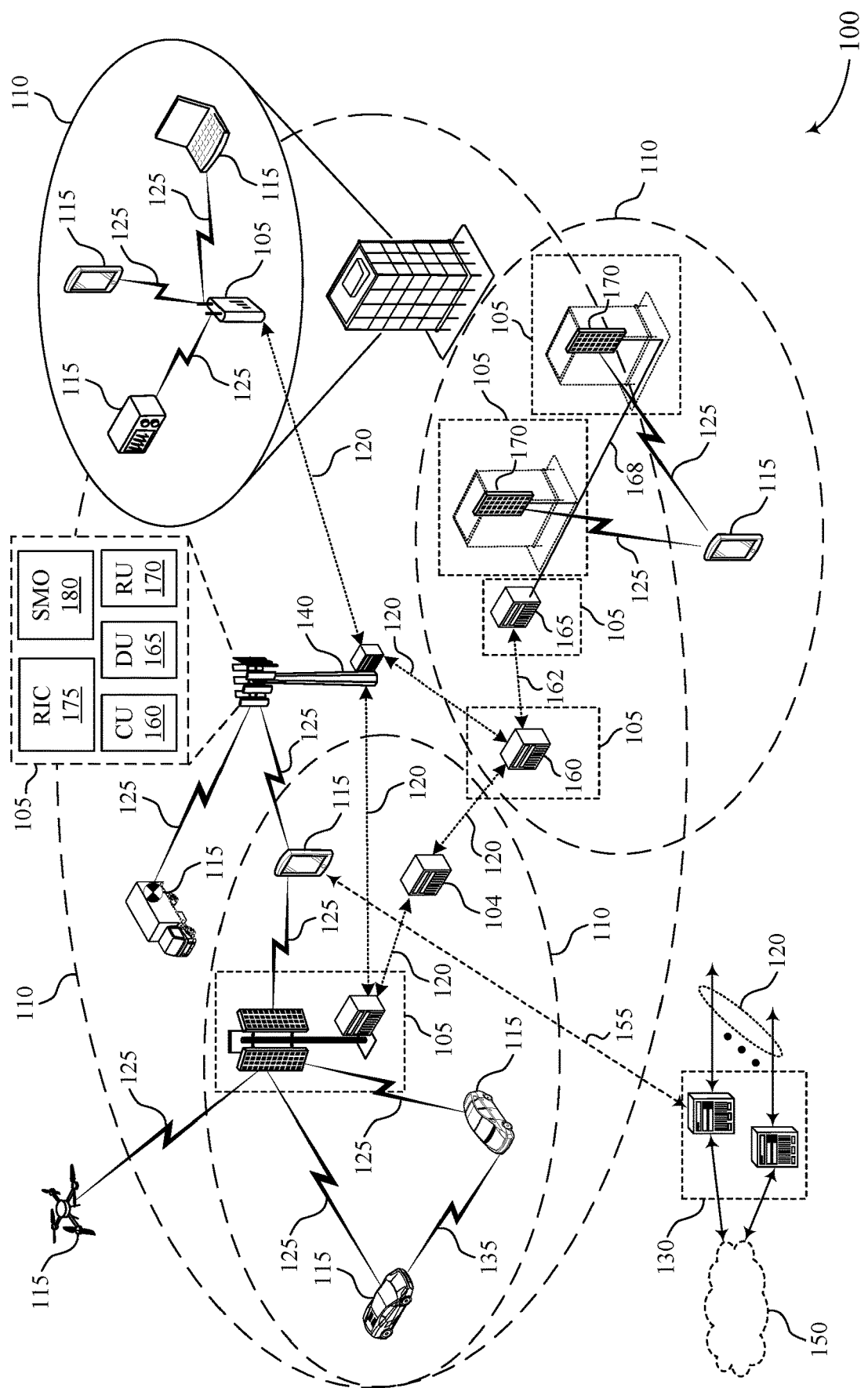
FIG. 1 illustrates an example of a wireless communications system that supports techniques for reporting correlation metrics for machine learning reproducibility in accordance with one or more aspects of the present disclosure.

In some implementations of wireless communications systems that may support machine learning techniques, an output (e.g., an output function, predictions) of a machine learning process may be generated based on training data. The training data may be associated with one or more scenarios for predicting beam or other communications parameters, including power saving, blockage mitigation, or the like. The training data may accordingly include one or more parameter sets associated with multiple communication environments or channel environments, or a combination thereof. After the training data is established, one or more devices may collect and report testing data that is associated with a particular environment (e.g., a testing environment), which may have a quantity of characteristics that affect wireless communications within the environment. As an example, different testing environments may include different quantities and sizes of objects that reflect, block, or otherwise affect wireless signals. In another example, a crowded metropolitan area may be associated with different communications and/or channel conditions than a rural area. In any case, devices may report the testing data corresponding to various environments and/or channels, which may then be used as an input for machine learning processes to predict various aspects of communications for various environments and channels.

In some cases, however, the training data may not be a good representation of a particular environment in which the machine learning techniques are implemented. That is, the training data may be based on one or more communication environments or one or more channel environments, or a combination thereof, but there may be a communication environment or channel environment that varies (e.g., significantly varies) from the plurality of communication environments associated with the training data. For example, the communication environment may have different quantities and positionings of reflectors, clusters, diffraction points, UEs, network entities, or other objects within the communication environment. Additionally, antenna configurations, antenna placements, antenna quantities, beamforming capabilities, and beam measurement capabilities may be different for one or more devices within the communication environment. When the testing data varies from the training data, machine learning techniques may be altogether abandoned, potentially requiring devices to fall back to other techniques until, for example, the machine learning server can be re-trained to obtain additional training data, which may be inefficient and fail to implement the advantages of machine learning-based predictions.

In accordance with examples as described herein, a machine learning server may generate a low-dimensional parameter set representing the training data. Similarly, one or more devices with the communication environment may generate a low-dimensional parameter set associated with testing data (e.g., data associated with the communication environment or the channel environment). A low-dimensional parameter set (e.g., a low-dimensional dataset) may refer to a set of parameters or data having a relatively reduced dimensionality with relation to an original, corresponding set of data, which may include a relatively large amount of data, features, and/or parameters. As an example, the low-dimensional parameter set representing the training data may include data having a reduced dimensionality (e.g., data in a low-dimensional space) with respect to a dimensionality of the training data (e.g., data in a high-dimensional space), such that the parameter set retains some meaningful properties of the training data. Likewise, the low-dimensional parameter set representing the testing data may include data having a reduced dimensionality with respect to a dimensionality of the testing data. A low-dimensional parameter set (e.g., data in a low-dimensional space that reflects the characteristics of data in a high-dimensional space) may be generated from the original data using various techniques including, for example, linear dimensionality reduction techniques, nonlinear dimensionality reduction techniques, feature extraction techniques, feature selection techniques, or the like.

The one or more devices may transmit a message to the machine learning server indicating the low-dimensional parameter set representing the testing data. The machine learning server may generate a reproducibility metric according to a correlation between the low-dimensional parameter set representing the training data and the received low-dimensional parameter set representing the testing data. The reproducibility metric may be associated with a confidence value for predictions generated by the machine learning server. The machine learning server may then transmit a message indicating the reproducibility metric to the one or more devices.

Accordingly, the one or more devices may perform communication procedures based on the received reproducibility metric. For example, the one or more devices may continue to rely on machine learning techniques if the reproducibility metric satisfies a threshold value, which may enable the devices to benefit from machine learning predictions and avoid discarding such techniques altogether. That is, the reproducibility metric may indicate that there is a "good enough" correlation between the testing data and the training data to utilize machine learning techniques, which may avoid having to wait for retraining before such techniques may be used in a particular environment. In other examples, the one or more devices may perform communication procedures according to measurements performed by the one or more devices if the reproducibility metric fails to satisfy the threshold value (e.g., the one or more devices may fall back to traditional techniques for determining communications parameters).

Aspects of the disclosure are initially described in the context of wireless communications systems. Aspects of the disclosure are additionally described with reference to machine learning diagrams. Aspects of the disclosure are further illustrated by and described with reference to apparatus diagrams, system diagrams, and flowcharts that relate to techniques for reporting correlation metrics for machine learning reproducibility.

FIG. 1 illustrates an example of a wireless communications system 100 that supports techniques for reporting correlation metrics for machine learning reproducibility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both, at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for reporting correlation metrics for machine learning reproducibility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some implementations, the wireless communications system 100 may support machine learning techniques to generate predictions (e.g., an output function) based on training data. The training data may be associated with a particular scenario or multiple different scenarios and may include one or more parameter sets associated with multiple communication environments (e.g., channel environments or coverage areas 110). In some cases, however, the training data may not be a good representation of a test environment (e.g., a location in which testing data is obtained by one or more wireless devices) in which the machine learning techniques are implemented. That is, the training data may be based on one or more communication environments or one or more channel environments, or a combination thereof, but there may be a communication environment or channel environment that varies (e.g., varies significantly) from the plurality of communication environments associated with the training data. For example, a communication environment (e.g., or channel environment) may have different quantities and positionings of reflectors, clusters, diffraction points, UEs 115, network entities 105, or other objects within the communication environment. Additionally, antenna configurations, antenna placements, antenna quantities, beamforming capabilities, and beam measurement capabilities, may be different for one or more devices (e.g., UEs 115 and network entities 105) within the communication environment.

In accordance with examples as described herein, a machine learning server may generate a low-dimensional parameter set representing the training data. Similarly, one or more devices (e.g., UEs 115 and network entities 105) within a communication environment and/or a channel environment may generate a low-dimensional parameter set associated with testing data (e.g., data associated with the communication environment or the channel environment). The one or more devices may transmit a message to the machine learning server indicating the low-dimensional parameter set representing the testing data. The machine learning server may generate a reproducibility metric according to a correlation between the low-dimensional parameter set representing the training data and the received low-dimensional parameter set representing the testing data. The reproducibility metric may be associated with a confidence value for predictions generated by the machine learning server. The machine learning server may then transmit a message indicating the reproducibility metric to the one or more devices.

Accordingly, the one or more devices may perform communication procedures based on the received reproducibility metric. For example, the one or more devices may continue to rely on machine learning techniques if the reproducibility metric satisfies a threshold value, or the one or more devices may perform communication procedures according to measurements performed by the one or more devices if the reproducibility metric fails to satisfy the threshold value.

Figure 2:
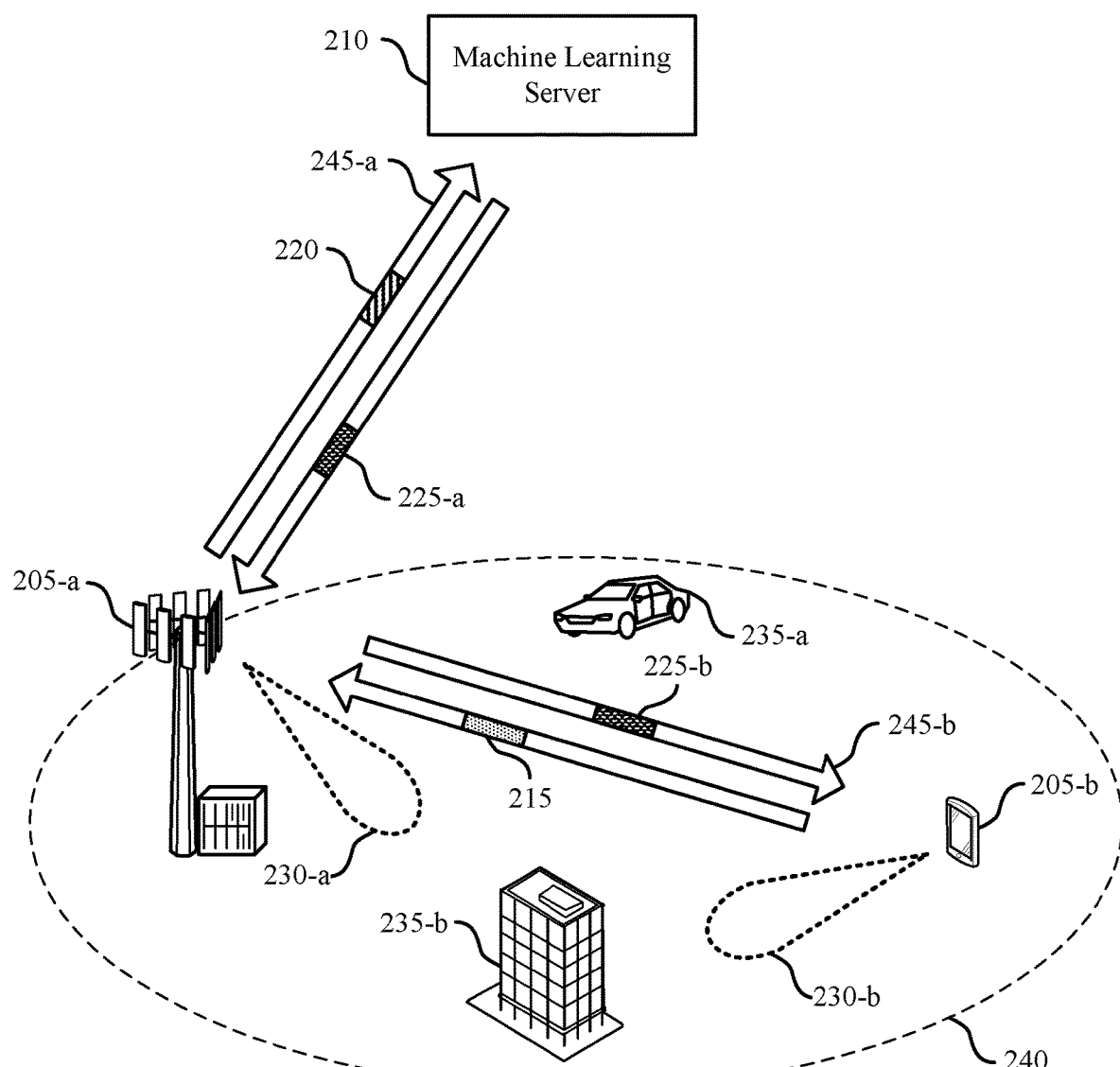
FIG. 2 illustrates an example of a wireless communications system that supports techniques for reporting correlation metrics for machine learning reproducibility in accordance with one or more aspects of the present disclosure.

FIG. 2 illustrates an example of a wireless communications system 200 that supports techniques for reporting correlation metrics for machine learning reproducibility in accordance with one or more aspects of the present disclosure. The wireless communications system 200 may include a device 205-*a* and a device 205-*b*, which may be examples of UEs 115 or network entities 105 as described herein with reference to FIG. 1. Additionally, the wireless communications system 200 may illustrate a communication environment 240, which may be an example of a coverage area 110, as described herein with reference to FIG. 1.

The wireless communications system 200 includes a machine learning server 210. In some examples, the machine learning server 210 may be a part of a device 205, such as a network entity 105, a UE 115, or another device. In other examples, the machine learning server 210 may be a standalone device, such as an independent node associated with a plurality of devices 205 in a network. For example, the machine learning server may be an example of or be included within one or more devices 205 in a network, such as UEs 115 or network entities 105. Additionally, or alternatively, the machine learning server 210 may be a separate (e.g., an independent device) that is in communication with one or more other devices in a network, or that is associated with one or more devices in the network, or that is common to (e.g., provides functionality to) one or more devices in the network, or any combination thereof.

The machine learning server 210 may communicate with devices 205 via a communication link 245-a, which may be an example of a communication link 125, a backhaul communication link 120, a midhaul communication link 162, or a fronthaul communication link 168, or the like, as described herein with reference to FIG. 1. Similarly, the device 205-a and the device 205-b may communicate via a communication link 245-b, which may be an example a communication link 125, as described herein with reference to FIG. 1.

In some implementations, the wireless communications system 200 may support machine learning techniques to generate predictions (e.g., an output function) based on training data. For example, the machine learning server 210 may be trained (e.g., configured) using the training data, and the training data may include one or more parameter sets associated with multiple communication environments 240 (e.g., or channel environments, or any combination thereof). For example, the training data may include information about quantities and positionings of clusters 235 (e.g., cluster 235-a, cluster 235-b, which may be examples of blockages, reflectors, diffraction points, among other examples), UEs 115, network entities 105, or other objects within the multiple communication environments 240 (e.g., or channel environments, or a combination thereof). Additionally, the training data may include information about antenna configurations, antenna placements, antenna quantities, beamforming capabilities, and beam measurement capabilities of one or more devices within the multiple communication environments 240.

The machine learning server 210 may generate (e.g., predict, for instance, using a machine learning model) one or more outputs (e.g., parameters, procedures, values, target functions, or other outputs) in response to input data received from, for example, the communication environment 240 (e.g., channel environment). The machine learning server 210 may transmit messages indicating the outputs to one or more devices within the communication environment 240. For example, the machine learning server 210 may transmit a message indicating the predictions, which may include beam weight predictions (e.g., for a blockage scenario or a non-blockage scenario), predicted reference signal received power (RSRP) values, predicted rates, spectral efficiency predictions, power saving parameters, blockage mitigation procedures (e.g., blockage predictions), or other predictions that may be used by the one or more devices 205 to support performing communications. The device 205-a and the device 205-b, for example, may form or adjust a beam 230-a or a beam 230-b, respectively, based on the received prediction information. The generation of the prediction information and outputs (e.g., using a machine learning model) is described in more detail herein, with reference to FIG. 3.

In some cases, however, the training data for the machine learning server 210 may not be a good representation of the communication environment 240 (e.g., or channel environment). For example, the training data may be based on a plurality of communication environments 240, but the communication environment 240 may vary significantly from the plurality of communication environments 240 associated with the training data for the machine learning server 210.

For example, the communication environment may have different quantities and positionings of clusters 235 (e.g., which may include reflectors or diffraction points), such as cluster 235-a and cluster 235-b, and devices 205 such as the device 205-a and the device 205-b, and other objects within the communication environment 240. Additionally, or alternatively, antenna configurations, antenna placements, antenna quantities, beamforming capabilities, and beam measurement capabilities may be different for one or more of the device 205-a and the device 205-b. This may result in predictions output by the machine learning server 210 being relatively poor for use in communications by the device 205-a and the device 205-b.

In some examples, such issues may be aided by retraining the machine learning server 210 with additional training data that may be relatively larger than the original training data or may represent a larger amount of communication environments 240 (e.g., or channel environments, or a combination thereof). However, this may result large amounts overhead for the larger amount of training data. Additionally, communicating larger amounts of training data to the machine learning server 210 may be associated with large amounts of latency, and may lead to over-training of the machine learning server 210 and poor fits for a machine learning model associated with the machine learning server 210.

Therefore, in accordance with examples as disclosed herein, the machine learning server 210 may generate a low-dimensional parameter set that represents the training data. For example, the machine learning server 210 may reduce the dimensionality of the training data by abstracting the training data, which may contain a relatively large quantity of dimensions (e.g., the data may be 100-dimensional), into a low-dimensional parameter set that may contain a relatively lower quantity of dimensions (e.g., the parameter set may be 8-dimensional). Similarly, the device 205-a and the device 205-b may generate a low-dimensional parameter set representing testing data, which may be data associated with the communication environment 240. In some examples, the device 205-a, the device 205-b, the machine learning server 210, or a combination thereof, may reduce the dimensionality of the training data or the testing data based, at least in part, on various dimensionality reduction techniques such as principal components analysis, non-negative matrix factorization, linear discriminant analysis, generalized discriminant analysis, among other examples. In such cases, data in a high-dimensional space (e.g., the training data, the testing data) may be transformed into data in a low-dimensional space that represents (e.g., retains certain characteristics and/or properties) of the high-dimensional data.

The testing data may include parameters collected by the device 205-a and/or the device 205-b, or information about the devices 205-a and/or the device 205-b. For example, the testing data may include information about quantities and positionings of the cluster 235-a and the cluster 235-b, the positions of the device 205-a and the device 205-b, or positions of other objects within the communication environment 240. Additionally, or alternatively, the testing data may include information about antenna configurations, antenna placements, antenna quantities, beamforming capabilities, and beam measurement capabilities of the device 205-a and the device 205-b, and information about the beam 230-a and/or beam 230-b associated with the device 205-a and the device 205-b, respectively.

In some examples, the machine learning server 210, the devices 205, or both may use principal components analysis (among other techniques) to abstract the training data or the testing data into a low-dimensional parameter set that represents the training data or the testing data, respectively. As an illustrative example, principal components analysis may be used to reduce a dimensionality of one or more relatively large data sets, for example, by transforming a set of variables into a relatively smaller set of variables that includes most of the information in the larger set. Here, principal components used for principal components analysis may refer to variables that are constructed as linear combinations of (initial) variables in an original (e.g., relatively large) dataset. Such combinations are generated in a way that the variables (e.g., principal components) may be uncorrelated and some amount (e.g., most) of the information within the initial variables is compressed into the principal components. Put another way, principal components reduction may reduce dimensionality of an original dataset while minimizing the loss of information, which may include discarding some components (e.g., having relatively low information) and considering the remaining components as variables (e.g., principal components) in a new dataset. The machine learning server 210 or the devices 205 may accordingly determine one or more parameters (e.g., dimensions) of the training data or the testing data that may be used to closely represent the entirety of the training data or the testing data, respectively.

In some cases, the device 205-a and the device 205-b may cooperate to generate the low-dimensional parameter set that represents the testing data. For example, the device 205-b may send a message containing a parameter indication 215 to the device 205-a that indicates one or more parameters, which may be information associated with the device 205-b or information about the communication environment 240 obtained by the device 205-b. The device 205-a may then generate the low-dimensional parameter set that represents testing data that includes the one or more parameters received from the device 205-b, other parameters known (e.g., obtained or measured) by the device 205-a, parameters received from other devices 205, or a combination thereof.

The device 205-a or the device 205-b, or both may transmit a message containing a parameter set indication 220, which may indicate, to the machine learning server 210, the low-dimensional parameter set that represents the testing data associated with the communication environment 240. In some cases, such as when the device 205-a and the device 205-b cooperate to generate the low-dimensional parameter set, the device 205-b may refrain from transmitting a message containing the parameter set indication 220 to the machine learning server 210.

The machine learning server 210 may thus receive, from one or more devices 205, one or more messages containing a parameter set indication 220 that indicates a low-dimensional parameter set associated with the communication environment 240. In some cases, such as when the machine learning server 210 receives multiple parameter set indications 220, the machine learning server 210 may combine multiple low-dimensional parameter sets received from multiple devices 205 into a single low-dimensional parameter set that represents testing data for the communication environment 240.

The machine learning server 210 may correlate the low-dimensional parameter set representing the training data for the machine learning server 210 and the low-dimensional parameter set representing the testing data associated with the communication environment 240. In some examples, the machine learning server 210 may correlate the low-dimensional parameter set representing the training data and the low-dimensional parameter set representing the testing data by correlating the principal components associated with each of the low-dimensional parameter sets. For example, the each low-dimensional parameter sets may contain one or more principal components (e.g., if the machine learning server 210, the devices 205, or a combination thereof, performed principal components analysis to obtain the low-dimensional parameter sets) and the machine learning server 210 may correlate the one or more principal components of each of the low-dimensional parameter sets. In some examples, the principal components may be one or more unit vectors fitted to the training data or the testing data.

The machine learning server 210 may generate a reproducibility metric that is or represents the correlation performed by the machine learning server 210. For example, the reproducibility metric may include a value or other indication representing how closely the testing data correlates to the training data. Additionally, or alternatively, the reproducibility metric may be or indicate a confidence value (e.g., a score) associated with predictions of the machine learning server 210 with respect to the communication environment 240.

In some cases, if the machine learning server 210 determines the reproducibility metric does not satisfy a threshold value, the machine learning server 210 may trigger retraining procedures. For example, the machine learning server 210 may generate (e.g., request, obtain, or compile) new training data that may, in some cases, include parameters associated with the communication environment 240. The machine learning server 210 may then be retrained with the new training data so that predictions from a machine learning model generated by the machine learning server 210 may be used by the device 205-a and the device 205-b with higher accuracy.

The machine learning server 210 may transmit a message to the device 205-a and the device 205-b containing a reproducibility metric indication 225-a which may indicate the reproducibility metric generated by the machine learning server 210. Additionally, or alternatively, the device 205-a and the device 205-b may cooperate to share information regarding the reproducibility metric, as illustrated. For example, the machine learning server 210 may transmit the message containing the reproducibility metric indication 225-a to the device 205-a. The device 205-a may then transmit a message containing the reproducibility metric indication 225-b to the device 205-b for indicating the reproducibility metric to the device 205-b.

The device 205-a and the device 205-b may perform communication procedures based on the reproducibility metric. For example, the device 205-a and the device 205-b may decide whether to use predictions associated with the machine learning server 210 in communication procedures. For example, the device 205-a and the device 205-b may continue to rely on machine learning techniques if the reproducibility metric satisfies a threshold value. Alternatively, the device 205-a and the device 205-b may perform communication procedures according to one or more measurements performed by the device 205-a and the device 205-b if the reproducibility metric fails to satisfy the threshold value.

Accordingly, the device 205-a and the device 205-b may refrain from using predictions from a machine learning model generated by the machine learning server 210 if the testing data associated with the communication environment 240 does not correlate relatively well with the training data of the machine learning server 210. In other cases, when the testing data associated with the communication environment 240 does correlate with the training data of the machine learning server 210 with some degree of accuracy (e.g., the testing data may be "close enough" to use based on the training data), predictions from the machine learning model generated by the machine learning server 210 may be used. In any case, the reproducibility metric may enable improve communication procedures at the device 205-a and the device 205-b and may lead to improved communication stability and user experience.

Figure 3:
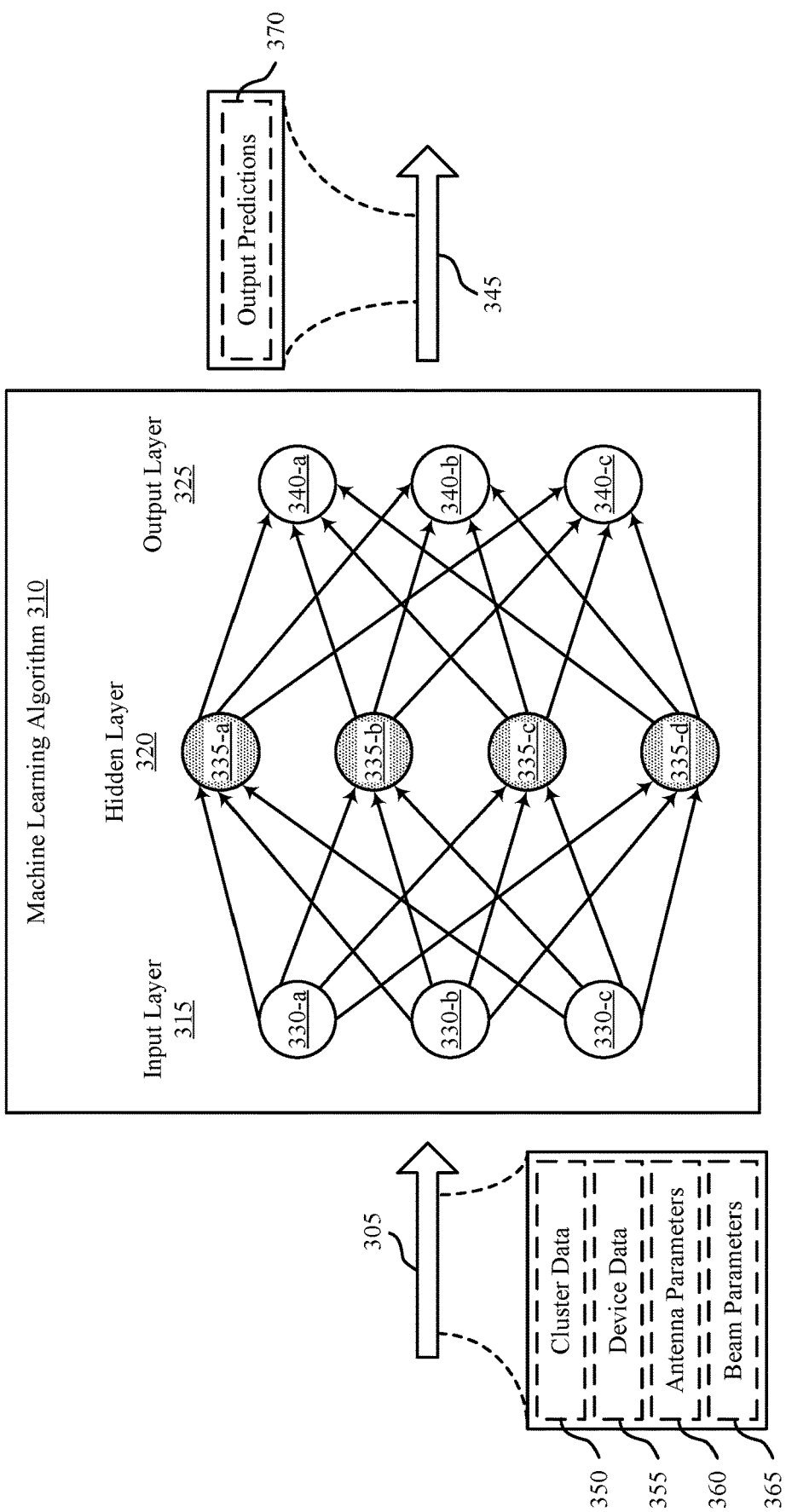
FIG. 3 illustrates an example of a machine learning process that supports techniques for reporting correlation metrics for machine learning reproducibility in accordance with one or more aspects of the present disclosure.

FIG. 3 illustrates an example of a machine learning process 300 that supports techniques for reporting correlation metrics for machine learning reproducibility in accordance with one or more aspects of the present disclosure. The machine learning process 300 may be implemented at a machine learning server, such as machine learning server 210 as described herein, with reference to FIG. 2. The machine learning process 300 may support training a machine learning model (e.g., an artificial neural network) for network power savings, UE power savings, load balancing, mobility management, beamforming, RSRP, rate, or spectral efficiency predictions, or any combination of these or other processes improved by machine learning, as described herein with reference to FIGS. 1 and 2.

The machine learning process 300 may include a machine learning algorithm 310. As illustrated, the machine learning algorithm 310 may be an example of a neural network (e.g., an artificial neural network), such as an FF or DFF neural network, an RNN, an LSTM neural network, or any other type of neural network. However, any other machine learning algorithms may be supported. For example, the machine learning algorithm 310 may implement a nearest neighbor algorithm, a linear regression algorithm, a Naïve Bayes algorithm, a random forest algorithm, or any other machine learning algorithm. Further, the machine learning process 300 may involve supervised learning, unsupervised learning, semi-supervised learning, reinforcement learning, or any combination thereof.

The machine learning algorithm 310 may include an input layer 315, one or more hidden layers 320, and an output layer 325. In a fully connected neural network with one hidden layer 320, each hidden layer node 335 (e.g., hidden layer node 335-a through hidden layer node 335-d) may receive a value from each input layer node 330 (e.g., input layer node 330-a through input layer node 330-c) as input, where each input may be weighted. These neural network weights may be based on a cost function that is revised during training of the machine learning algorithm 310. Similarly, each output layer node 340 (e.g., output layer node 340-a through output layer node 340-c) may receive a value from each hidden layer node 335 as input, where the inputs are weighted. If post-deployment training (e.g., online training) is supported, memory may be allocated to store errors or gradients for reverse matrix multiplication. These errors or gradients may support updating the machine learning algorithm 310 based on output feedback. Training the machine learning algorithm 310 may support computation of the weights (e.g., connecting the input layer nodes 330 to the hidden layer nodes 335 and the hidden layer nodes 335 to the output layer nodes 340) to map an input pattern to a desired output outcome. This training may result in a device-specific machine learning algorithm 310 based on the historic application data and data transfer for a specific network entity 105 or UE 115.

In some examples, input values 305 may be sent to the machine learning algorithm 310 for processing. In some examples, preprocessing may be performed according to a sequence of operations on the input values 305 such that the input values 305 may be in a format that is compatible with the machine learning algorithm 310. The input values 305 may be converted into a set of k input layer nodes 330 at the input layer 315. In some cases, different measurements may be input at different input layer nodes 330 of the input layer 315. Some input layer nodes 330 may be assigned default values (e.g., values of 0) if the quantity of input layer nodes 330 exceeds the quantity of inputs corresponding to the input values 305. As illustrated, the input layer 315 may include three input layer nodes 330-a, 330-b, and 330-c. However, it is to be understood that the input layer 315 may include any quantity of input layer nodes 330 (e.g., 20 input nodes).

The machine learning algorithm 310 may convert the input layer 315 to a hidden layer 320 based on a quantity of input-to-hidden weights between the k input layer nodes 330 and the n hidden layer nodes 335. The machine learning algorithm 310 may include any quantity of hidden layers 320 as intermediate steps between the input layer 315 and the output layer 325. Additionally, each hidden layer 320 may include any quantity of nodes. For example, as illustrated, the hidden layer 320 may include four hidden layer nodes 335-a, 335-b, 335-c, and 335-d. However, it is to be understood that the hidden layer 320 may include any quantity of hidden layer nodes 335 (e.g., 10 input nodes). In a fully connected neural network, each node in a layer may be based on each node in the previous layer. For example, the value of hidden layer node 335-a may be based on the values of input layer nodes 330-a, 330-b, and 330-c (e.g., with different weights applied to each node value).

The machine learning algorithm 310 may determine values for the output layer nodes 340 of the output layer 325 following one or more hidden layers 320. For example, the machine learning algorithm 310 may convert the hidden layer 320 to the output layer 325 based on a quantity of hidden-to-output weights between the n hidden layer nodes 335 and the m output layer nodes 340. In some cases, n=m. Each output layer node 340 may correspond to a different output value 345 of the machine learning algorithm 310. As illustrated, the machine learning algorithm 310 may include three output layer nodes 340-a, 340-b, and 340-c, supporting three different threshold values. However, it is to be understood that the output layer 325 may include any quantity of output layer nodes 340. In some examples, post-processing may be performed on the output values 345 according to a sequence of operations such that the output values 345 may be in a format that is compatible with reporting the output values 345.

The machine learning process 300 may support model training for network power savings, UE power savings, load balancing, mobility management, channel measurements, beam management, or any other functionality supported by a network entity 105 or a UE 115. For example, a device (e.g., network entity 105, UE 115, or other training device) may train a machine learning algorithm 310 (e.g., a machine learning model, a neural network) using one or more security techniques to mitigate negative effects from corrupted data. In some examples, the device may receive one or more indications of whether data can be trusted (e.g., one or more trust scores). If the device determines that a subset of data is untrusted, the device may refrain from using the untrusted data for training the machine learning algorithm 310. Instead, the device (e.g., a network entity 105) may train the machine learning algorithm 310 using trusted data (e.g., from one or more trusted UEs 115).

For example, the machine learning algorithm 310 may be trained using training data (e.g., the trusted data), to receive a set of input values 305, which may represent cluster data 350, device data 355, antenna parameter 360, beam parameters 365, or any combination of these or other input parameters for the machine learning algorithm 310. The machine learning algorithm 310 may process the set of input values 305, based on the processing, may output a set of output values 345, which may represent one or more output predictions 370 or other output parameters for the machine learning algorithm 310. For example, an output prediction 370 may be used by a device (e.g., a network entity 105, a UE 115, or another device) in performing communication procedures, such as to adjust beams, predict blockage or clusters, adjust antenna parameters, or any other operation. Additionally, or alternatively, the machine learning algorithm 310 may support other input values 305, output values 345, or both to support other AI-based improvements for a wireless communications system.

In some examples, a machine learning server associated with the machine learning algorithm 310 may generate a low-dimensional parameter set (e.g., a low-dimensional dataset) representing the training data. The machine learning server may further receive, from one or more devices (e.g., UEs 115 and network entities 105) within a communication environment (e.g., or channel environment), a low-dimensional parameter set (e.g., a low-dimensional dataset) representing testing data associated with the communication environment or channel environment. The machine learning server may generate a reproducibility metric according to a correlation between the low-dimensional parameter set representing the training data and the received low-dimensional parameter set representing the testing data. The reproducibility metric may be associated with a confidence value associated with predictions generated by the machine learning server. The machine learning server may then transmit a message indicating the reproducibility metric to the one or more devices.

In some examples, such as if the machine learning server determines the reproducibility metric does not satisfy a threshold value, the machine learning server may trigger retraining procedures. For example, the machine learning server may generate (e.g., request, obtain, or compile) new training data that may, in some cases, include parameters associated with the communication environment. The machine learning server may then be trained (e.g., retrained) with the new training data so that predictions from the machine learning algorithm 310 generated by the machine learning server may be used by the one or more devices with higher accuracy.

The one or more devices may perform communication procedures based on the reproducibility metric received from the machine learning server. For example, the one or more devices may decide whether to use predictions from the machine learning algorithm 310 in communication procedures. For example, the one or more devices may continue to rely on machine learning techniques if the reproducibility metric satisfies a threshold value. Alternatively, the one or more devices may perform communication procedures according to one or more measurements performed by the one or more devices if the reproducibility metric fails to satisfy the threshold value.

Accordingly, the one or more devices may use, or refrain from using, predictions 370 from the machine learning algorithm 310 generated by the machine learning server based on whether the testing data associated with the communication and/or channel environment correlates with the training data of the machine learning server. Such correlation may be provided to various devices in a system via the reproducibility metric signaled by the machine learning server, which may improve communication procedures at the one or more devices and may lead to improved communication stability and user experience.

Figure 4:
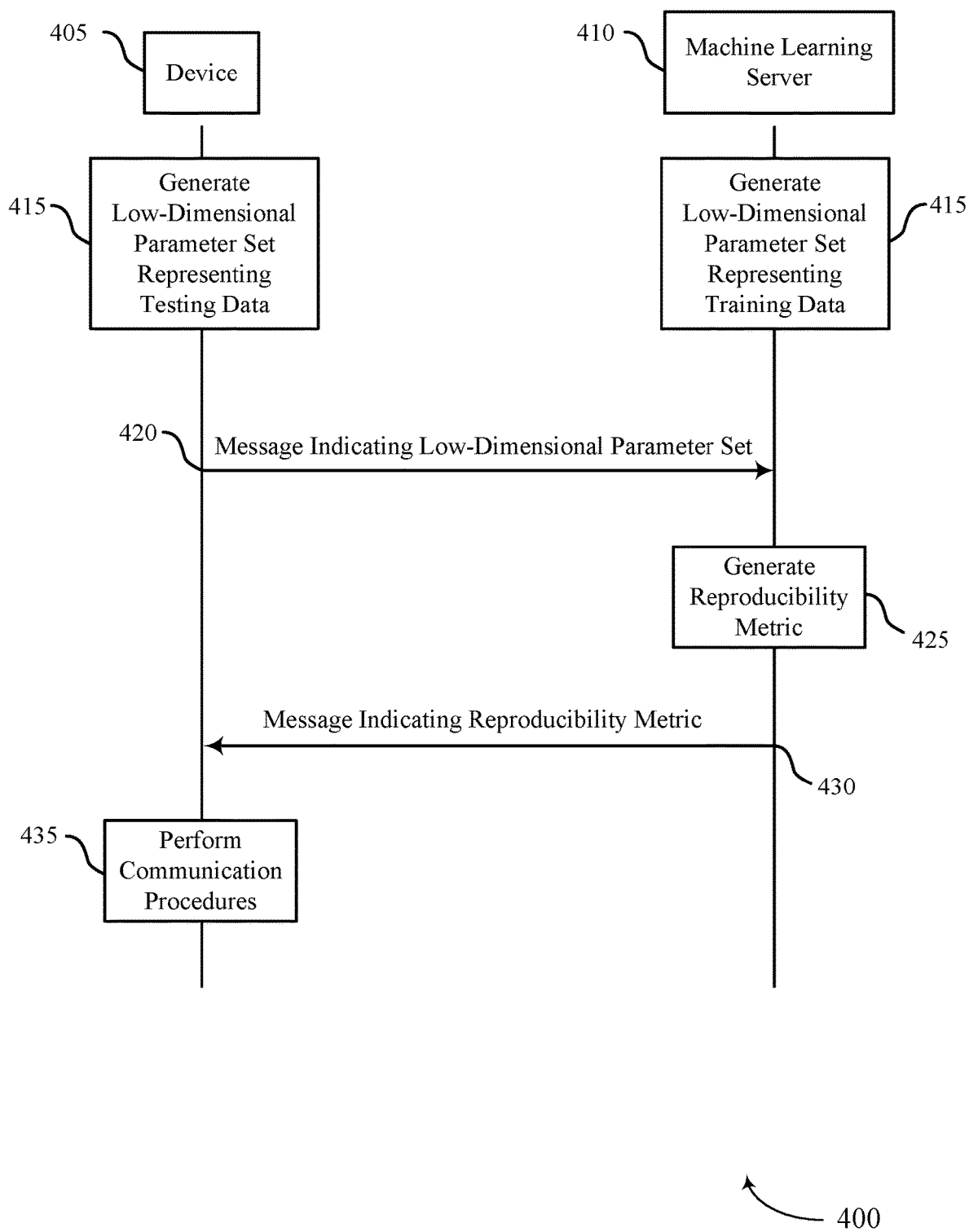
FIG. 4 illustrates an example of a process flow that supports techniques for reporting correlation metrics for machine learning reproducibility in accordance with one or more aspects of the present disclosure.

FIG. 4 illustrates an example of a process flow 400 that supports techniques for reporting correlation metrics for machine learning reproducibility in accordance with one or more aspects of the present disclosure. The process flow 400 may be implemented in a wireless communications system 100 or a wireless communications system 200 as described herein with reference to FIGS. 1 and 2. The process flow 400 may include a device 405, which may be an example of a UE, a network entity, or another device as described herein, for example, with reference to FIGS. 1 through 3. The process flow 400 includes a machine learning server 410, which may be an example of machine learning server 210 as described herein, with reference to FIG. 2. For instance, the machine learning server 410 may be a part of or included in another device, such as a network entity or a UE. In other examples, the machine learning server 410 may be part of or included in an independent (e.g., standalone) device that is common to, and in communication with, one or more other devices (such as one or more network nodes). In some aspects, the machine learning server 410 may be associated with one or more functions or nodes of a network. In the following descriptions of the process flow 400, the operations performed by the devices may be performed in different orders or at different times. Additionally, or alternatively, some operations may be omitted from the process flow 400, and other operations may be added to the process flow 400.

At 415, the machine learning server 410 may generate a first set of parameters associated with training data, the training data corresponding to a plurality of communication environments (e.g., or channel environments, or a combination thereof). The first set of parameters may include a low-dimensional parameter set representing the training data. Similarly, the device 405 may generate a second set of parameters associated with testing data, the testing data corresponding to a communication environment (e.g., or channel environment). The second set of parameters may include a low-dimensional parameter set representing the testing data. In some examples, the machine learning server 410, the device 405, or both, may use principal components analysis to generate the parameter sets by abstracting the training data or the testing data into a low-dimensional parameter set that represents the training data or the testing data, respectively. Generation of the low-dimensional parameter sets is described in more detail herein, with respect to FIG. 2.

At 420, the device 405 may transmit a first message indicating the second set of parameters associated with the testing data to the machine learning server. In some examples, the machine learning server 410 may receive additional messages indicating parameter sets from other devices within the communication environment (e.g., or channel environment). In these examples, the machine learning server 410 may combine the parameter sets into a single parameter set associated with the communication environment (e.g., or channel environment).

At 425, the machine learning server 410 may generate a reproducibility metric. The reproducibility metric may be based on a correlation between the first set of parameters and the second set of parameters. In some examples, the machine learning server 410 may correlate the first set of parameters and the second set of parameters by correlating the principal components associated with each of the first set of parameters and the second set of parameters. The reproducibility metric may be or represent the correlation performed by the machine learning server 410. For example, the reproducibility metric may represent how closely the testing data correlates to the training data. Additionally, or alternatively, the reproducibility metric may be or indicate a confidence value (e.g., score) associated with predictions of the machine learning server 410 with respect to the communication environment (e.g., or channel environment).

At 430, the machine learning server 410 may transmit a second message indicating the reproducibility metric to the device 405. In some examples, the machine learning server 410 may transmit additional messages indicating the reproducibility metric to one or more other devices within the communication environment (e.g., or channel environment).

At 435, the device 405 may perform communication procedures according to the reproducibility metric. In some cases, the device 405 may determine that the reproducibility metric satisfies a threshold value, and the device 405 may perform one or more communication procedures according to one or more predictions made by the machine learning server 410 using the training data. In other cases, the device 405 may determine that the reproducibility metric fails to satisfy a threshold value, and the device 405 may perform one or more communication procedures according to one or more measurements performed by the device 405. In some examples, the device 405 may transmit a third message indicating the reproducibility metric to another device within the communication environment (e.g., or channel environment).

Figure 5:
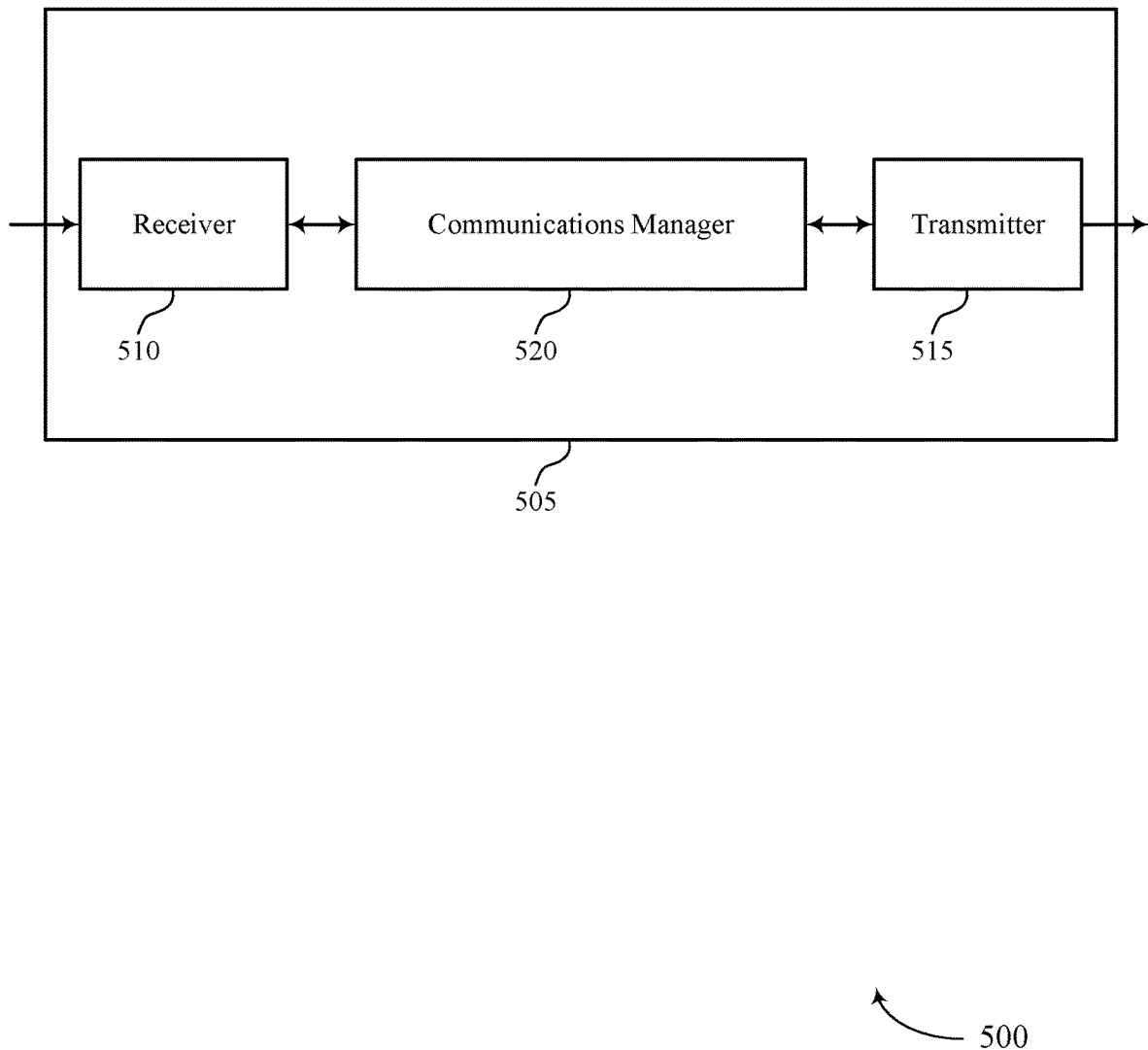
FIGS. 5 and 6 illustrate block diagrams of devices that support techniques for reporting correlation metrics for machine learning reproducibility in accordance with one or more aspects of the present disclosure.

FIG. 5 illustrates a block diagram 500 of a device 505 that supports techniques for reporting correlation metrics for machine learning reproducibility in accordance with one or more aspects of the present disclosure. The device 505 may be an example of aspects of a machine learning server 210, a UE 115 or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reporting correlation metrics for machine learning reproducibility). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reporting correlation metrics for machine learning reproducibility). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for reporting correlation metrics for machine learning reproducibility as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a machine learning server in accordance with examples as disclosed herein. For example, the communications manager 520 may be configured as or otherwise support a means for generating a first set of parameters representing training data, the training data corresponding to one or more communication environments or one or more channel environments, or a combination thereof, where the first set of parameters has a reduced dimensionality with respect to a dimensionality of the training data. The communications manager 520 may be configured as or otherwise support a means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The communications manager 520 may be configured as or otherwise support a means for transmitting, to the one or more devices, a message indicating a reproducibility metric for the communication environment or the channel environment, or both, the reproducibility metric being based on a correlation between the first set of parameters and the second set of parameters.

Additionally, or alternatively, the communications manager 520 may support wireless communications at a first device in accordance with examples as disclosed herein. For example, the communications manager 520 may be configured as or otherwise support a means for generating a second set of parameters representing testing data, the testing data corresponding to a communication environment or a channel environment, or both, where the second set of parameters has a reduced dimensionality with respect to a dimensionality of the testing data. The communications manager 520 may be configured as or otherwise support a means for transmitting, to a machine learning server, a first message indicating the second set of parameters representing the testing data. The communications manager 520 may be configured as or otherwise support a means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reporting correlation metrics for machine learning reproducibility that may provide improved communication reliability, improved user experience related to reduced processing, and more efficient utilization of communication resources.

Figure 6:
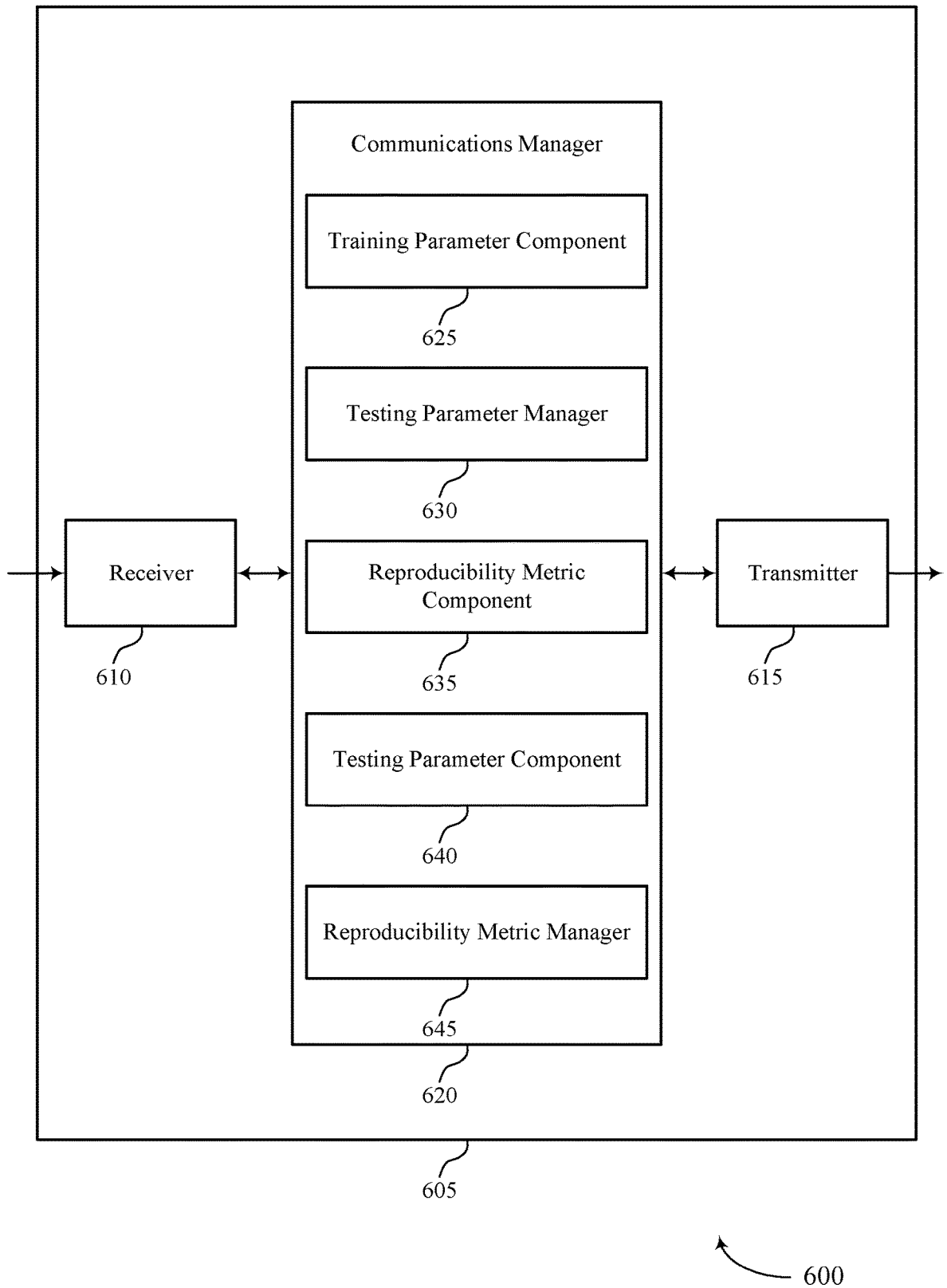

FIG. 6 illustrates a block diagram 600 of a device 605 that supports techniques for reporting correlation metrics for machine learning reproducibility in accordance with one or more aspects of the present disclosure. The device 605 may be an example of aspects of a device 505, machine learning server 210, a UE 115, or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for reporting correlation metrics for machine learning reproducibility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for reporting correlation metrics for machine learning reproducibility). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for reporting correlation metrics for machine learning reproducibility as described herein. For example, the communications manager 620 may include a training parameter component 625, a testing parameter manager 630, a reproducibility metric component 635, a testing parameter component 640, a reproducibility metric manager 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a machine learning server in accordance with examples as disclosed herein. The training parameter component 625 may be configured as or otherwise support a means for generating a first set of parameters representing training data, the training data corresponding to one or more communication environments or one or more channel environments, or a combination thereof, where the first set of parameters has a reduced dimensionality with respect to a dimensionality of the training data. The testing parameter manager 630 may be configured as or otherwise support a means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The reproducibility metric component 635 may be configured as or otherwise support a means for transmitting, to the one or more devices, a message indicating a reproducibility metric for the communication environment or the channel environment, or both, the reproducibility metric being based on a correlation between the first set of parameters and the second set of parameters.

Additionally, or alternatively, the communications manager 620 may support wireless communications at a first device in accordance with examples as disclosed herein. The testing parameter component 640 may be configured as or otherwise support a means for generating a second set of parameters representing testing data, the testing data corresponding to a communication environment or a channel environment, or both, where the second set of parameters has a reduced dimensionality with respect to a dimensionality of the testing data. The testing parameter manager 630 may be configured as or otherwise support a means for transmitting, to a machine learning server, a first message indicating the second set of parameters representing the testing data. The reproducibility metric manager 645 may be configured as or otherwise support a means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

Figure 7:
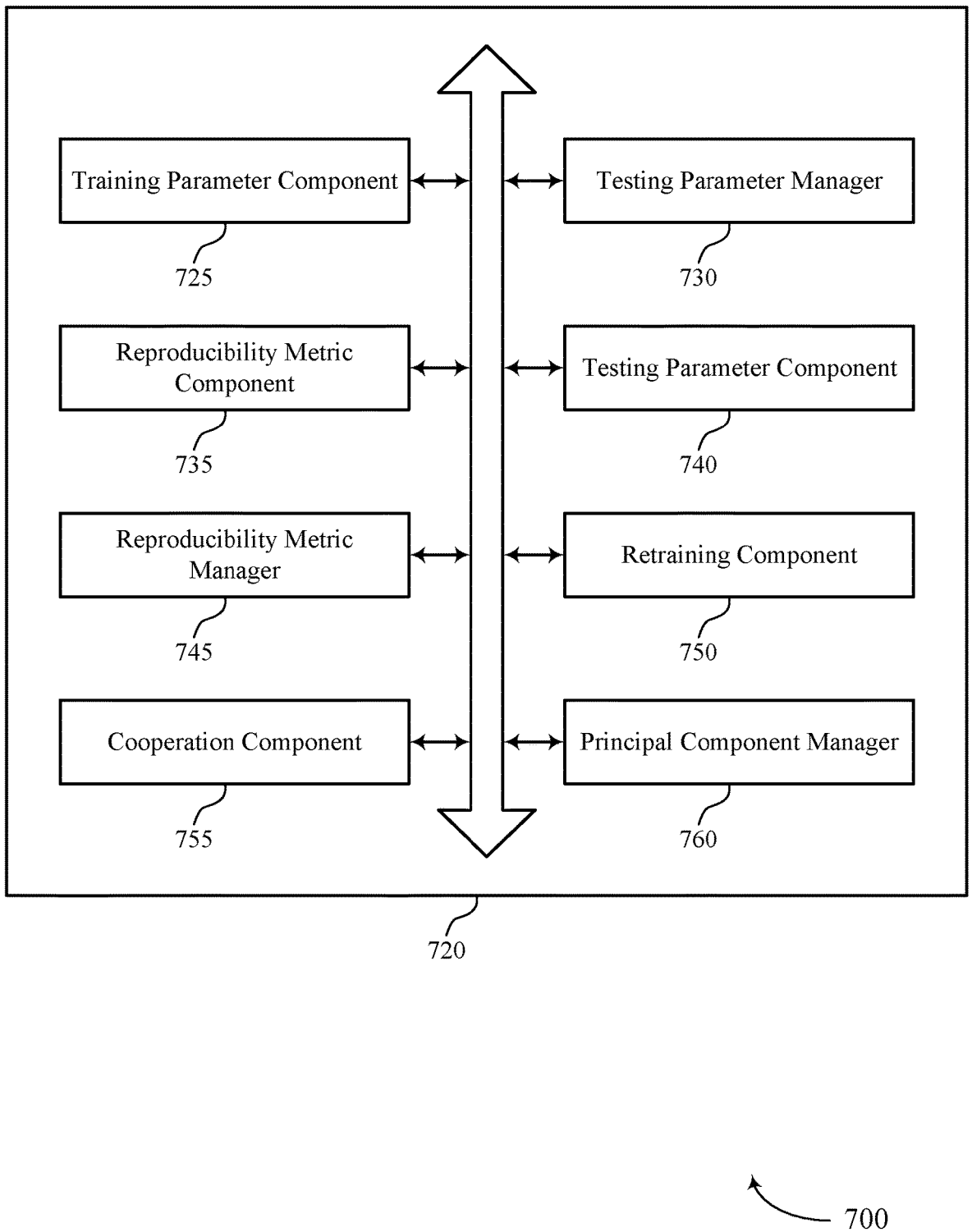
FIG. 7 illustrates a block diagram of a communications manager that supports techniques for reporting correlation metrics for machine learning reproducibility in accordance with one or more aspects of the present disclosure.

FIG. 7 illustrates a block diagram 700 of a communications manager 720 that supports techniques for reporting correlation metrics for machine learning reproducibility in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for reporting correlation metrics for machine learning reproducibility as described herein. For example, the communications manager 720 may include a training parameter component 725, a testing parameter manager 730, a reproducibility metric component 735, a testing parameter component 740, a reproducibility metric manager 745, a retraining component 750, a cooperation component 755, a principal component manager 760, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a machine learning server in accordance with examples as disclosed herein. The training parameter component 725 may be configured as or otherwise support a means for generating a first set of parameters representing training data, the training data corresponding to one or more communication environments or one or more channel environments, or a combination thereof, where the first set of parameters has a reduced dimensionality with respect to a dimensionality of the training data. The testing parameter manager 730 may be configured as or otherwise support a means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The reproducibility metric component 735 may be configured as or otherwise support a means for transmitting, to the one or more devices, a message indicating a reproducibility metric for the communication environment or the channel environment, or both, the reproducibility metric being based on a correlation between the first set of parameters and the second set of parameters.

In some examples, the reproducibility metric indicates, to the one or more devices, to perform one or more communication procedures according to one or more predictions from a machine learning model generated by the machine learning server using the training data, the reproducibility metric indicating to perform the one or more communication procedures based on the reproducibility metric satisfying a threshold value.

In some examples, the reproducibility metric indicates, to the one or more devices, to perform one or more communication procedures according to one or more measurements performed by the one or more devices, the reproducibility metric indicating to perform the one or more communication procedures based on the reproducibility metric failing to satisfy a threshold value.

In some examples, the reproducibility metric indicates a confidence value associated with predictions from a machine learning model generated by the machine learning server using the training data applied to the communication environment.

In some examples, the predictions from the machine learning model generated by the machine learning server include a beam weight prediction for a non-blockage scenario or a blockage scenario.

In some examples, the reproducibility metric component 735 may be configured as or otherwise support a means for generating the reproducibility metric based on the correlation between the first set of parameters and the second set of parameters.

In some examples, to support generating the reproducibility metric, the principal component manager 760 may be configured as or otherwise support a means for generating the reproducibility metric based on a correlation between one or more principal components associated with the training data and one or more principal components associated with the testing data, where the first set of parameters includes the one or more principal components associated with the training data, and where the second set of parameters includes the one or more principal components associated with the testing data.

In some examples, the retraining component 750 may be configured as or otherwise support a means for generating additional training data for the one or more communication environments or the one or more channel environments, or a combination thereof, based on the reproducibility metric failing to satisfy a threshold value.

In some examples, the training data includes an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

In some examples, the testing data includes an indication of at least one of a quantity of clusters in the communication environment or channel environment, or both, a quantity of reflectors in the communication environment or channel environment, or both, a quantity of diffraction points in the communication environment or channel environment, or both, positioning information associated with the one or more devices, an antenna module capability, a quantity of antenna modules, a placement of antenna modules, a beamforming capability of the one or more devices, or a beam measurement capability of the one or more devices.

In some examples, the machine learning server is part of a UE or part of a network entity, or includes an independent node associated with a set of multiple devices in a network.

Additionally, or alternatively, the communications manager 720 may support wireless communications at a first device in accordance with examples as disclosed herein. The testing parameter component 740 may be configured as or otherwise support a means for generating a second set of parameters representing testing data, the testing data corresponding to a communication environment or a channel environment, or both, where the second set of parameters has a reduced dimensionality with respect to a dimensionality of the testing data. In some examples, the testing parameter manager 730 may be configured as or otherwise support a means for transmitting, to a machine learning server, a first message indicating the second set of parameters representing the testing data. The reproducibility metric manager 745 may be configured as or otherwise support a means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

In some examples, the reproducibility metric indicates to perform one or more communication procedures according to one or more predictions from a machine learning model generated by the machine learning server using the training data, the reproducibility metric indicating the first device to perform the one or more communication procedures based on the reproducibility metric satisfying a threshold value.

In some examples, the reproducibility metric indicates to perform one or more communication procedures according to one or more measurements performed by the first device, the reproducibility metric indicating the first device to perform the one or more communication procedures based on the reproducibility metric failing to satisfy a threshold value.

In some examples, the reproducibility metric indicates a confidence value associated with predictions from a machine learning model generated by the machine learning server using the training data applied to the communication environment or the channel environment, or both.

In some examples, the predictions from the machine learning model generated by the machine learning server associated with the training data include a beam weight prediction for a non-blockage scenario or a blockage scenario.

In some examples, the cooperation component 755 may be configured as or otherwise support a means for receiving, from a second device within the communication environment or the channel environment, or both, a message indicating one or more parameters, where generating the second set of parameters is based on receiving the message indicating the one or more parameters.

In some examples, the cooperation component 755 may be configured as or otherwise support a means for transmitting, to a second device within the communication environment or the channel environment, or both, a message indicating the reproducibility metric based on receiving the reproducibility metric.

In some examples, the testing data includes an indication of at least one of a quantity of clusters in the communication environment or the channel environment, or both, a quantity of reflectors in the communication environment or the channel environment, or both, a quantity of diffraction points in the communication environment or the channel environment, or both, positioning information associated with the first device, an antenna module capability, a quantity of antenna modules, a placement of antenna modules, a beamforming capability of the first device, or a beam measurement capability of the first device.

In some examples, the training data includes an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

Figure 8:
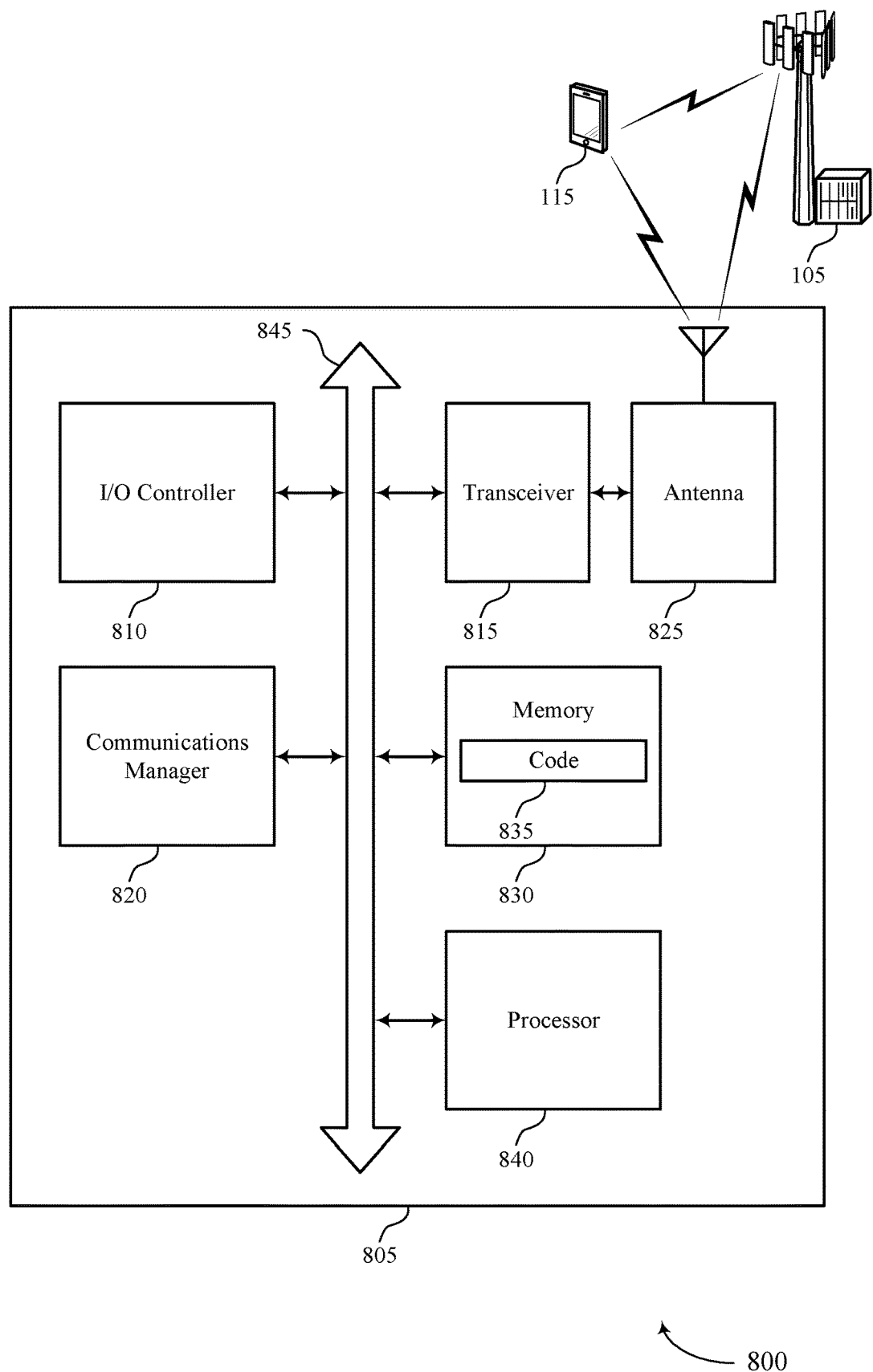
FIG. 8 illustrates a diagram of a system including a UE that supports techniques for reporting correlation metrics for machine learning reproducibility in accordance with one or more aspects of the present disclosure.

FIG. 8 illustrates a diagram of a system 800 including a device 805 that supports techniques for reporting correlation metrics for machine learning reproducibility in accordance with one or more aspects of the present disclosure. The device 805 may be an example of or include the components of a device 505, a device 605, machine learning server 210, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for reporting correlation metrics for machine learning reproducibility). For example, the device 805 or a component of the device 805 may include a processor 840 and memory 830 coupled with or to the processor 840, the processor 840 and memory 830 configured to perform various functions described herein.

The communications manager 820 may support wireless communications at a machine learning server in accordance with examples as disclosed herein. For example, the communications manager 820 may be configured as or otherwise support a means for generating a first set of parameters representing training data, the training data corresponding to one or more communication environments or one or more channel environments, or a combination thereof, where the first set of parameters has a reduced dimensionality with respect to a dimensionality of the training data. The communications manager 820 may be configured as or otherwise support a means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The communications manager 820 may be configured as or otherwise support a means for transmitting, to the one or more devices, a message indicating a reproducibility metric for the communication environment or the channel environment, or both, the reproducibility metric being based on a correlation between the first set of parameters and the second set of parameters.

Additionally, or alternatively, the communications manager 820 may support wireless communications at a first device in accordance with examples as disclosed herein. For example, the communications manager 820 may be configured as or otherwise support a means for generating a second set of parameters representing testing data, the testing data corresponding to a communication environment or a channel environment, or both, where the second set of parameters has a reduced dimensionality with respect to a dimensionality of the testing data. The communications manager 820 may be configured as or otherwise support a means for transmitting, to a machine learning server, a first message indicating the second set of parameters representing the testing data. The communications manager 820 may be configured as or otherwise support a means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

By including or configuring the communications manager 820 in accordance with examples as described herein, the device 805 may support techniques for reporting correlation metrics for machine learning reproducibility that may provide improved communication reliability, improved user experience related to reduced processing, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for reporting correlation metrics for machine learning reproducibility as described herein, or the processor 840 and the memory 830 may be otherwise configured to perform or support such operations.

Figure 9:
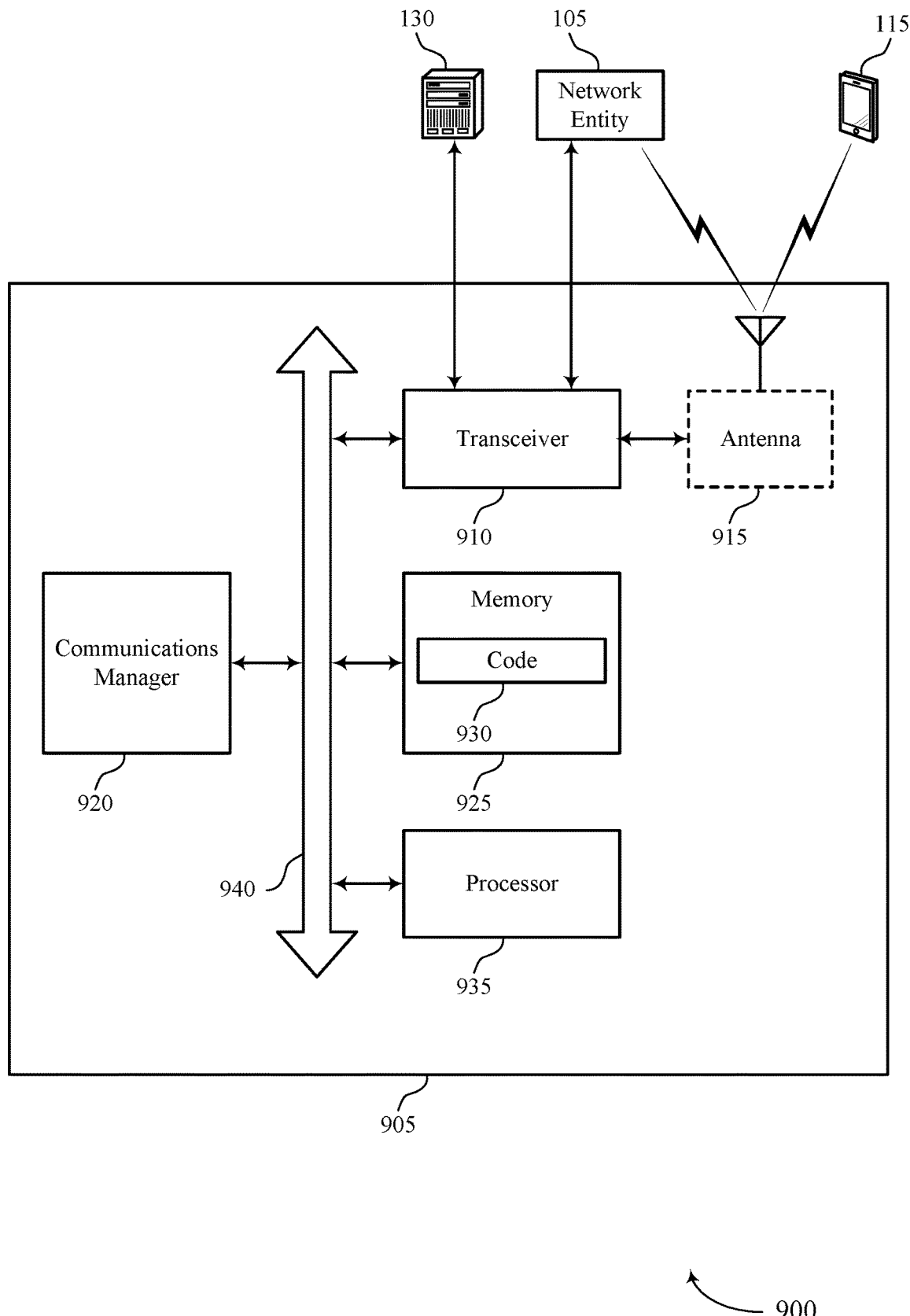
FIG. 9 illustrates a diagram of a system including a network entity that supports techniques for reporting correlation metrics for machine learning reproducibility in accordance with one or more aspects of the present disclosure.

FIG. 9 illustrates a diagram of a system 900 including a device 905 that supports techniques for reporting correlation metrics for machine learning reproducibility in accordance with one or more aspects of the present disclosure. The device 905 may be an example of or include the components of a device 505, a device 605, machine learning server 210, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting techniques for reporting correlation metrics for machine learning reproducibility). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a machine learning server in accordance with examples as disclosed herein. For example, the communications manager 920 may be configured as or otherwise support a means for generating a first set of parameters representing training data, the training data corresponding to one or more communication environments or one or more channel environments, or a combination thereof, where the first set of parameters has a reduced dimensionality with respect to a dimensionality of the training data. The communications manager 920 may be configured as or otherwise support a means for receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The communications manager 920 may be configured as or otherwise support a means for transmitting, to the one or more devices, a message indicating a reproducibility metric for the communication environment or the channel environment, or both, the reproducibility metric being based on a correlation between the first set of parameters and the second set of parameters.

Additionally, or alternatively, the communications manager 920 may support wireless communications at a first device in accordance with examples as disclosed herein. For example, the communications manager 920 may be configured as or otherwise support a means for generating a second set of parameters representing testing data, the testing data corresponding to a communication environment or a channel environment, or both, where the second set of parameters has a reduced dimensionality with respect to a dimensionality of the testing data. The communications manager 920 may be configured as or otherwise support a means for transmitting, to a machine learning server, a first message indicating the second set of parameters representing the testing data. The communications manager 920 may be configured as or otherwise support a means for receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof.

By including or configuring the communications manager 920 in accordance with examples as described herein, the device 905 may support techniques for reporting correlation metrics for machine learning reproducibility that may provide improved communication reliability, improved user experience related to reduced processing, and more efficient utilization of communication resources.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of techniques for reporting correlation metrics for machine learning reproducibility as described herein, or the processor 935 and the memory 925 may be otherwise configured to perform or support such operations.

Figure 10:
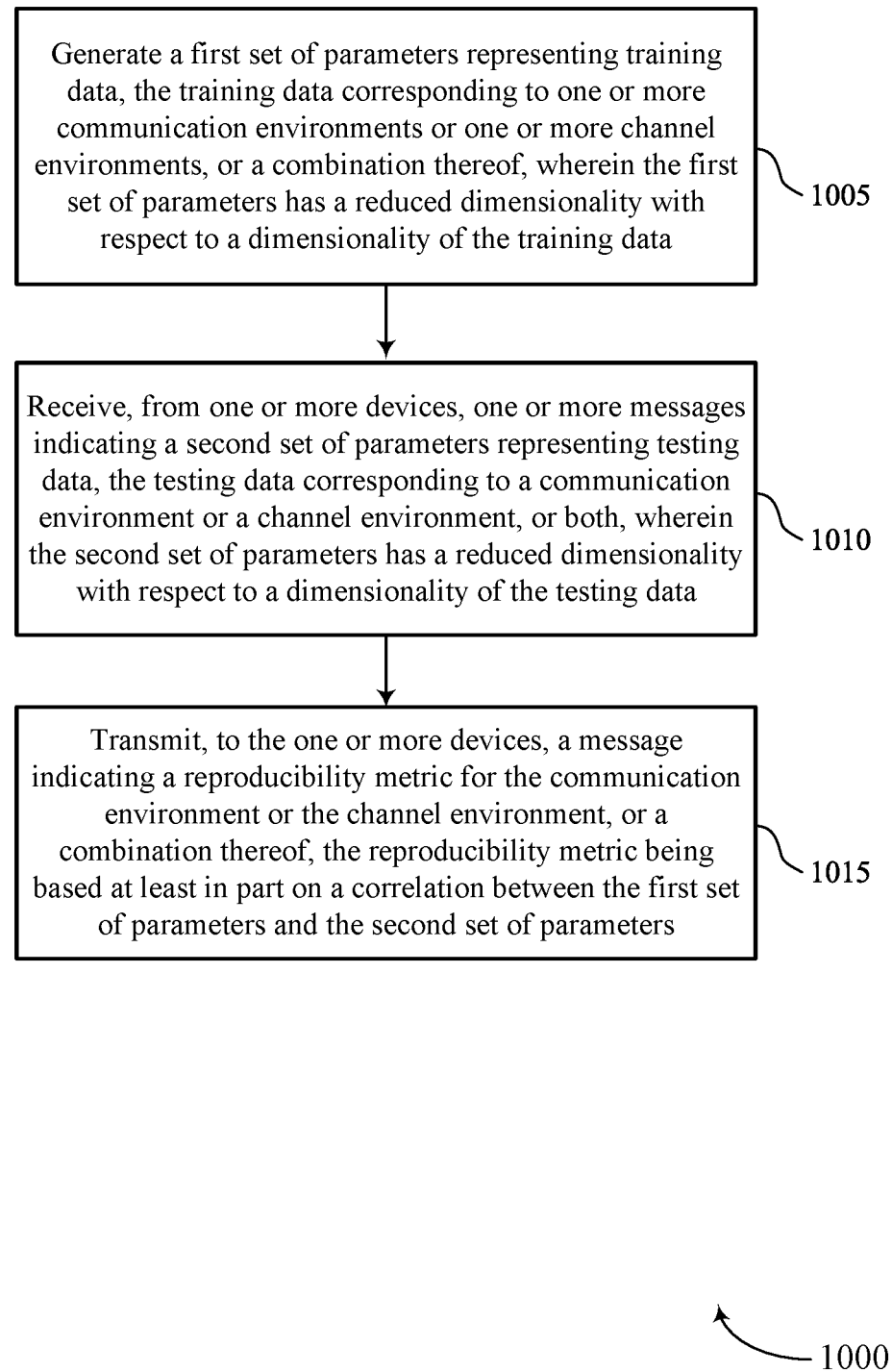
FIGS. 10 through 13 illustrate flowcharts showing methods that support techniques for reporting correlation metrics for machine learning reproducibility in accordance with one or more aspects of the present disclosure.

FIG. 10 illustrates a flowchart illustrating a method 1000 that supports techniques for reporting correlation metrics for machine learning reproducibility in accordance with one or more aspects of the present disclosure. The operations of the method 1000 may be implemented by a machine learning server, UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include generating a first set of parameters representing training data, the training data corresponding to one or more communication environments or one or more channel environments, or a combination thereof, where the first set of parameters has a reduced dimensionality with respect to a dimensionality of the training data. The operations of 1005 may be performed in accordance with examples as disclosed herein. In some examples, aspects of the operations of 1005 may be performed by a training parameter component 725 as described with reference to FIG. 7.

At 1010, the method may include receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The operations of 1010 may be performed in accordance with examples as disclosed herein. In some examples, aspects of the operations of 1010 may be performed by a testing parameter manager 730 as described with reference to FIG. 7.

At 1015, the method may include transmitting, to the one or more devices, a message indicating a reproducibility metric for the communication environment or the channel environment, or both, the reproducibility metric being based on a correlation between the first set of parameters and the second set of parameters. The operations of 1015 may be performed in accordance with examples as disclosed herein. In some examples, aspects of the operations of 1015 may be performed by a reproducibility metric component 735 as described with reference to FIG. 7.

Figure 11:
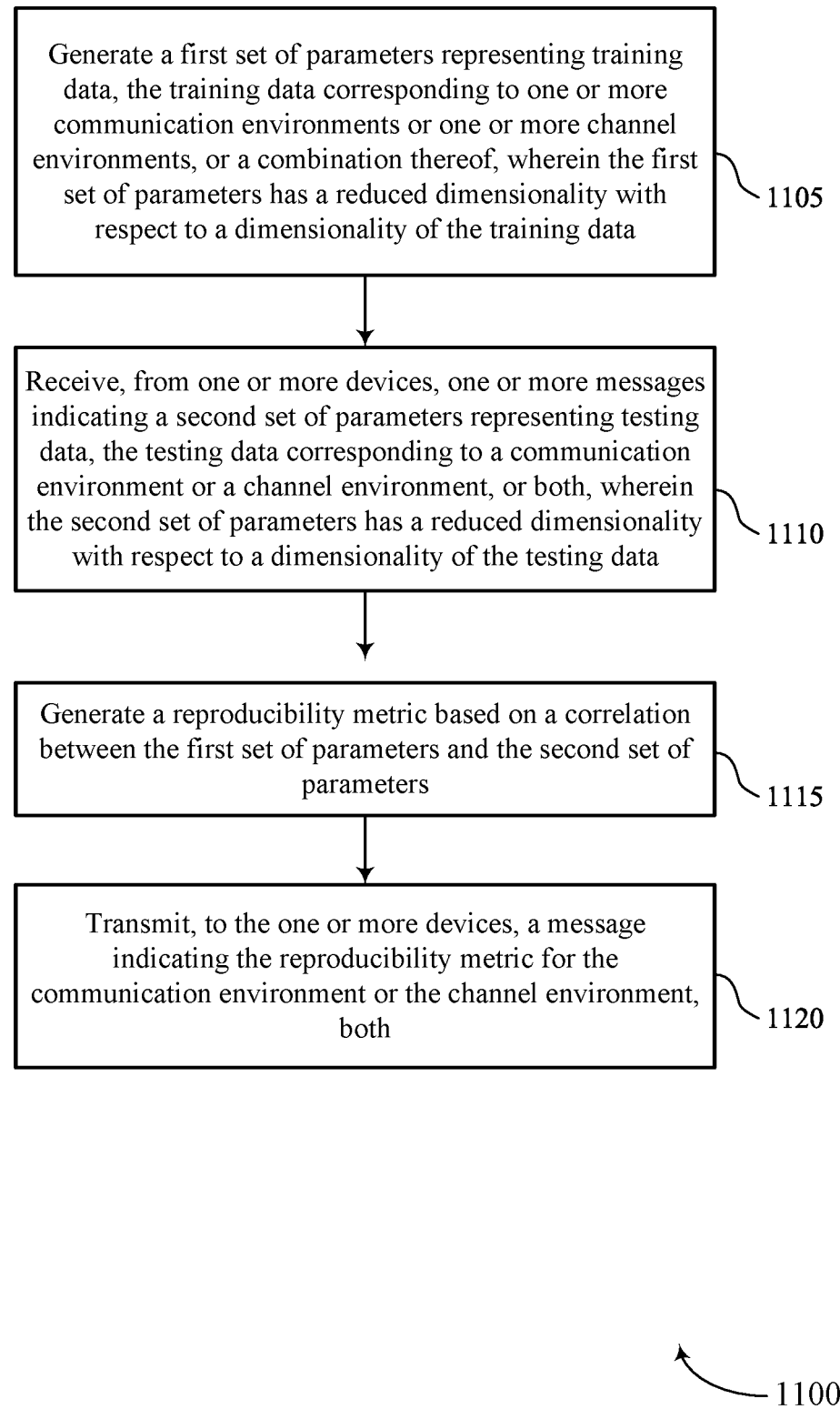

FIG. 11 illustrates a flowchart illustrating a method 1100 that supports techniques for reporting correlation metrics for machine learning reproducibility in accordance with one or more aspects of the present disclosure. The operations of the method 1100 may be implemented by a machine learning server, a UE, or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include generating a first set of parameters representing training data, the training data corresponding to one or more communication environments or one or more channel environments, or a combination thereof, where the first set of parameters has a reduced dimensionality with respect to a dimensionality of the training data. The operations of 1105 may be performed in accordance with examples as disclosed herein. In some examples, aspects of the operations of 1105 may be performed by a training parameter component 725 as described with reference to FIG. 7.

At 1110, the method may include receiving, from one or more devices, one or more messages indicating a second set of parameters representing testing data, the testing data corresponding to a communication environment or a channel environment, or both, where the second set of parameters has a reduced dimensionality with respect to a dimensionality of the testing data. The operations of 1110 may be performed in accordance with examples as disclosed herein. In some examples, aspects of the operations of 1110 may be performed by a testing parameter manager 730 as described with reference to FIG. 7.

At 1115, the method may include generating the reproducibility metric based on the correlation between the first set of parameters and the second set of parameters. The operations of 1115 may be performed in accordance with examples as disclosed herein. In some examples, aspects of the operations of 1115 may be performed by a reproducibility metric component 735 as described with reference to FIG. 7.

At 1120, the method may include transmitting, to the one or more devices, a message indicating a reproducibility metric for the communication environment or the channel environment, or both, the reproducibility metric being based on a correlation between the first set of parameters and the second set of parameters. The operations of 1120 may be performed in accordance with examples as disclosed herein. In some examples, aspects of the operations of 1120 may be performed by a reproducibility metric component 735 as described with reference to FIG. 7.

Figure 12:
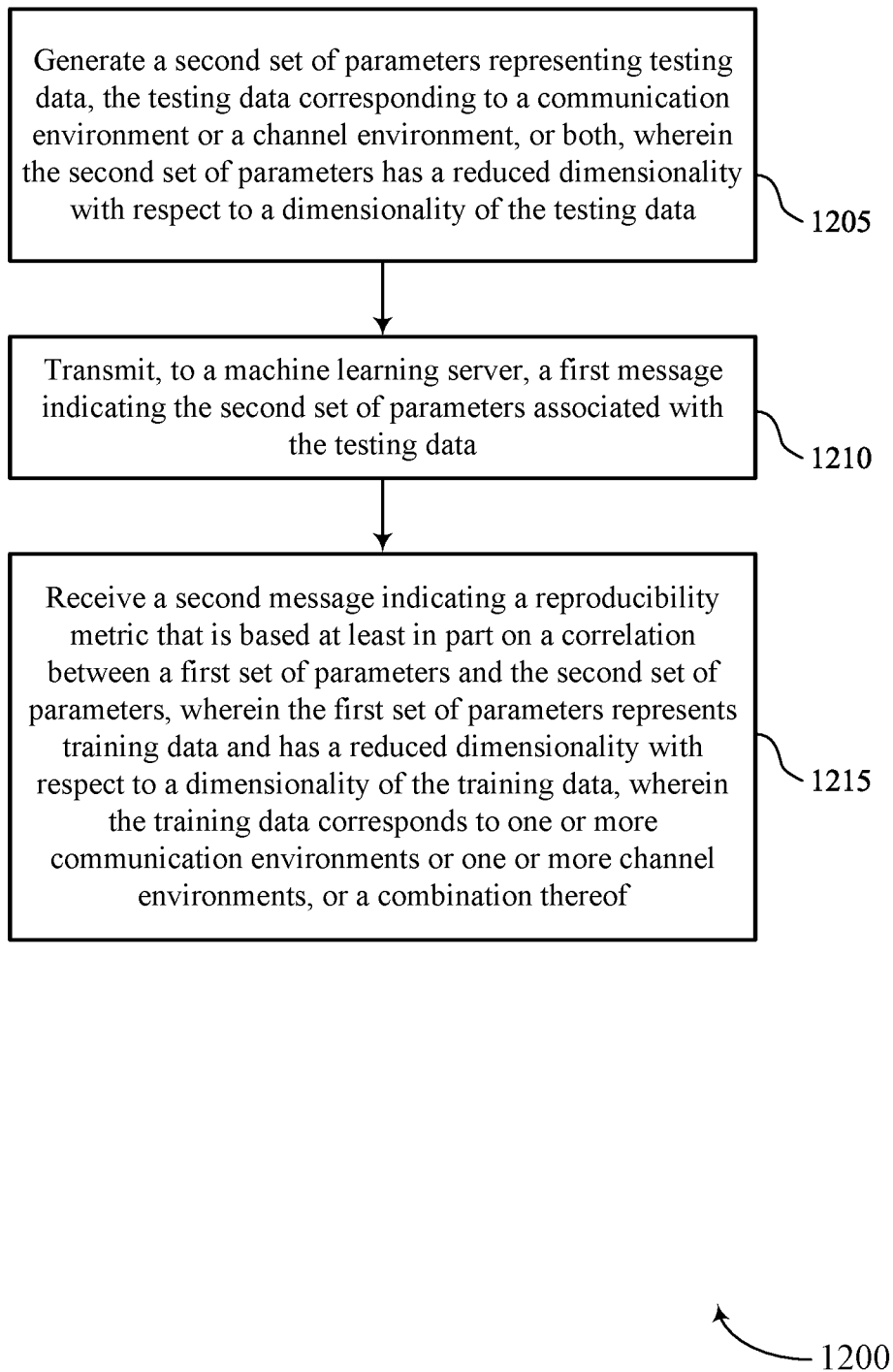

FIG. 12 illustrates a flowchart illustrating a method 1200 that supports techniques for reporting correlation metrics for machine learning reproducibility in accordance with one or more aspects of the present disclosure. The operations of the method 1200 may be implemented by a machine learning server, a UE, or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include generating a second set of parameters representing testing data, the testing data corresponding to a communication environment or a channel environment, or both, where the second set of parameters has a reduced dimensionality with respect to a dimensionality of the testing data. The operations of 1205 may be performed in accordance with examples as disclosed herein. In some examples, aspects of the operations of 1205 may be performed by a testing parameter component 740 as described with reference to FIG. 7.

At 1210, the method may include transmitting, to a machine learning server, a first message indicating the second set of parameters representing the testing data. The operations of 1210 may be performed in accordance with examples as disclosed herein. In some examples, aspects of the operations of 1210 may be performed by a testing parameter manager 730 as described with reference to FIG. 7.

At 1215, the method may include receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof. The operations of 1215 may be performed in accordance with examples as disclosed herein. In some examples, aspects of the operations of 1215 may be performed by a reproducibility metric manager 745 as described with reference to FIG. 7.

Figure 13:
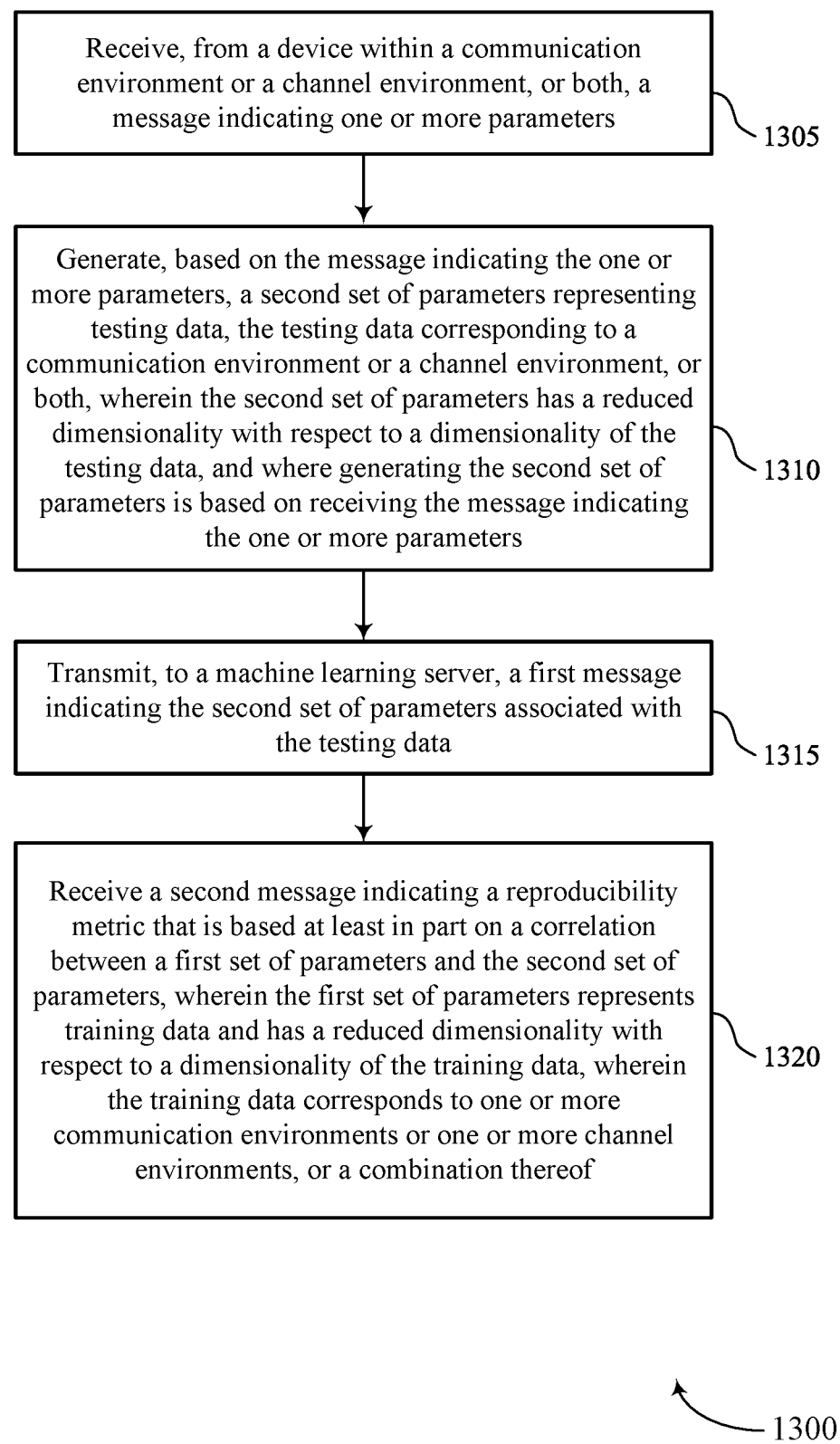

FIG. 13 illustrates a flowchart illustrating a method 1300 that supports techniques for reporting correlation metrics for machine learning reproducibility in accordance with one or more aspects of the present disclosure. The operations of the method 1300 may be implemented by a machine learning server 210, a UE, or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include receiving, from a device within a communication environment or channel environment, or both, a message indicating one or more parameters. The operations of 1305 may be performed in accordance with examples as disclosed herein. In some examples, aspects of the operations of 1305 may be performed by a cooperation component 755 as described with reference to FIG. 7.

At 1310, the method may include generating a second set of parameters representing testing data, the testing data corresponding to the communication environment or the channel environment, or both, where the second set of parameters has a reduced dimensionality with respect to a dimensionality of the testing data, and where generating the second set of parameters is based on receiving the message indicating the one or more parameters. The operations of 1310 may be performed in accordance with examples as disclosed herein. In some examples, aspects of the operations of 1310 may be performed by a testing parameter component 740 as described with reference to FIG. 7.

At 1315, the method may include transmitting, to a machine learning server, a first message indicating the second set of parameters representing the testing data. The operations of 1315 may be performed in accordance with examples as disclosed herein. In some examples, aspects of the operations of 1315 may be performed by a testing parameter manager 730 as described with reference to FIG. 7.

At 1320, the method may include receiving a second message indicating a reproducibility metric that is based on a correlation between a first set of parameters and the second set of parameters, where the first set of parameters represents training data and has a reduced dimensionality with respect to a dimensionality of the training data, where the training data corresponds to one or more communication environments or one or more channel environments, or a combination thereof. The operations of 1320 may be performed in accordance with examples as disclosed herein. In some examples, aspects of the operations of 1320 may be performed by a reproducibility metric manager 745 as described with reference to FIG. 7.

The following provides an overview of aspects of the present disclosure:

Aspect 1: A method for wireless communications at a machine learning server, comprising: generating a first set of parameters representing training data, the training data corresponding to one or more communication environments or one or more channel environments, or a combination thereof, wherein the first set of parameters has a reduced dimensionality with respect to a dimensionality of the training data; receiving, from one or more devices, one or more messages indicating a second set of parameters representing testing data, the testing data corresponding to a communication environment or a channel environment, or both, wherein the second set of parameters has a reduced dimensionality with respect to a dimensionality of the testing data; and transmitting, to the one or more devices, a message indicating a reproducibility metric for the communication environment or the channel environment, or both, the reproducibility metric being based at least in part on a correlation between the first set of parameters and the second set of parameters.

Aspect 2: The method of aspect 1, wherein the reproducibility metric indicates, to the one or more devices, to perform one or more communication procedures according to one or more predictions from a machine learning model generated by the machine learning server using the training data, the reproducibility metric indicating to perform the one or more communication procedures based at least in part on the reproducibility metric satisfying a threshold value.

Aspect 3: The method of any of aspects 1 through 2, wherein the reproducibility metric indicates, to the one or more devices, to perform one or more communication procedures according to one or more measurements performed by the one or more devices, the reproducibility metric indicating to perform the one or more communication procedures based at least in part on the reproducibility metric failing to satisfy a threshold value.

Aspect 4: The method of any of aspects 1 through 3, wherein the reproducibility metric indicates a confidence value associated with predictions from a machine learning model generated by the machine learning server using the training data applied to the communication environment.

Aspect 5: The method of aspect 4, wherein the predictions from the machine learning model generated by the machine learning server include a beam weight prediction for a non-blockage scenario or a blockage scenario.

Aspect 6: The method of any of aspects 1 through 5, further comprising: generating the reproducibility metric based at least in part on the correlation between the first set of parameters and the second set of parameters.

Aspect 7: The method of aspect 6, wherein generating the reproducibility metric comprises: generating the reproducibility metric based at least in part on a correlation between one or more principal components associated with the training data and one or more principal components associated with the testing data, wherein the first set of parameters comprises the one or more principal components associated with the training data, and wherein the second set of parameters comprises the one or more principal components associated with the testing data.

Aspect 8: The method of any of aspects 1 through 7, further comprising: generating additional training data for the one or more communication environments or the one or more channel environments, or a combination thereof, based at least in part on the reproducibility metric failing to satisfy a threshold value.

Aspect 9: The method of any of aspects 1 through 8, wherein the training data comprises an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

Aspect 10: The method of any of aspects 1 through 9, wherein the testing data comprises an indication of at least one of a quantity of clusters in the communication environment or channel environment, or both, a quantity of reflectors in the communication environment or channel environment, or both, a quantity of diffraction points in the communication environment or channel environment, or both, positioning information associated with the one or more devices, an antenna module capability, a quantity of antenna modules, a placement of antenna modules, a beamforming capability of the one or more devices, or a beam measurement capability of the one or more devices.

Aspect 11: The method of any of aspects 1 through 10, wherein the machine learning server is part of a UE or part of a network entity, or comprises an independent node associated with a plurality of devices in a network.

Aspect 12: A method for wireless communications at a first device, comprising: generating a second set of parameters representing testing data, the testing data corresponding to a communication environment or a channel environment, or both, wherein the second set of parameters has a reduced dimensionality with respect to a dimensionality of the testing data; transmitting, to a machine learning server, a first message indicating the second set of parameters representing the testing data; and receiving a second message indicating a reproducibility metric that is based at least in part on a correlation between a first set of parameters and the second set of parameters, wherein the first set of parameters represents training data and has a reduced dimensionality with respect to a dimensionality of the training data, wherein the training data corresponds to one or more communication environments or one or more channel environments, or a combination thereof.

Aspect 13: The method of aspect 12, wherein the reproducibility metric indicates to perform one or more communication procedures according to one or more predictions from a machine learning model generated by the machine learning server using the training data, the reproducibility metric indicating the first device to perform the one or more communication procedures based at least in part on the reproducibility metric satisfying a threshold value.

Aspect 14: The method of any of aspects 12 through 13, wherein the reproducibility metric indicates to perform one or more communication procedures according to one or more measurements performed by the first device, the reproducibility metric indicating the first device to perform the one or more communication procedures based at least in part on the reproducibility metric failing to satisfy a threshold value.

Aspect 15: The method of any of aspects 12 through 14, wherein the reproducibility metric indicates a confidence value associated with predictions from a machine learning model generated by the machine learning server using the training data applied to the communication environment or the channel environment, or both.

Aspect 16: The method of aspect 15, wherein the predictions from the machine learning model generated by the machine learning server associated with the training data include a beam weight prediction for a non-blockage scenario or a blockage scenario.

Aspect 17: The method of any of aspects 12 through 16, further comprising: receiving, from a second device within the communication environment or the channel environment, or both, a message indicating one or more parameters, wherein generating the second set of parameters is based at least in part on receiving the message indicating the one or more parameters.

Aspect 18: The method of any of aspects 12 through 17, further comprising: transmitting, to a second device within the communication environment or the channel environment, or both, a message indicating the reproducibility metric based at least in part on receiving the reproducibility metric.

Aspect 19: The method of any of aspects 12 through 18, wherein the testing data comprises an indication of at least one of a quantity of clusters in the communication environment or the channel environment, or both, a quantity of reflectors in the communication environment or the channel environment, or both, a quantity of diffraction points in the communication environment or the channel environment, or both, positioning information associated with the first device, an antenna module capability, a quantity of antenna modules, a placement of antenna modules, a beamforming capability of the first device, or a beam measurement capability of the first device.

Aspect 20: The method of any of aspects 12 through 19, wherein the training data comprises an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices Aspect 21: An apparatus for wireless communications at a machine learning server, comprising a processor; memory coupled with the processor; and instructions stored in the memory and executable by the processor to cause the apparatus to perform a method of any of aspects 1 through 11.

Aspect 22: An apparatus for wireless communications at a machine learning server, comprising at least one means for performing a method of any of aspects 1 through 11.

Aspect 23: A non-transitory computer-readable medium storing code for wireless communications at a machine learning server, the code comprising instructions executable by a processor to perform a method of any of aspects 1 through 11.

Aspect 24: An apparatus for wireless communications at a first device, comprising a processor; memory coupled with the processor; and instructions stored in the memory and executable by the processor to cause the apparatus to perform a method of any of aspects 12 through 20.

Aspect 25: An apparatus for wireless communications at a first device, comprising at least one means for performing a method of any of aspects 12 through 20.

Aspect 26: A non-transitory computer-readable medium storing code for wireless communications at a first device, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a machine learning server, comprising:
   a processor;
   memory coupled with the processor; and
   instructions stored in the memory and executable by the processor to cause the apparatus to:
      generate a first set of parameters representing training data, the training data corresponding to one or more communication environments or one or more channel environments, or a combination thereof, wherein the first set of parameters has a reduced dimensionality with respect to a dimensionality of the training data;
      receive, from one or more devices, one or more messages indicating a second set of parameters representing testing data, the testing data corresponding to a communication environment or a channel environment, or both, wherein the second set of parameters has a reduced dimensionality with respect to a dimensionality of the testing data; and
      transmit, to the one or more devices, a message indicating a reproducibility metric for the communication environment or the channel environment, or both, the reproducibility metric being based at least in part on a correlation between the first set of parameters and the second set of parameters.

2. The apparatus of claim 1, wherein the reproducibility metric indicates, to the one or more devices, to perform one or more communication procedures according to one or more predictions from a machine learning model generated by the machine learning server using the training data, the reproducibility metric indicating to perform the one or more communication procedures based at least in part on the reproducibility metric satisfying a threshold value.

3. The apparatus of claim 1, wherein the reproducibility metric indicates, to the one or more devices, to perform one or more communication procedures according to one or more measurements performed by the one or more devices, the reproducibility metric indicating to perform the one or more communication procedures based at least in part on the reproducibility metric failing to satisfy a threshold value.

4. The apparatus of claim 1, wherein the reproducibility metric indicates a confidence value associated with predictions from a machine learning model generated by the machine learning server using the training data applied to the communication environment.

5. The apparatus of claim 4, wherein the predictions from the machine learning model generated by the machine learning server include a beam weight prediction for a non-blockage scenario or a blockage scenario.

6. The apparatus of claim 1, wherein the instructions are further executable by the processor to cause the apparatus to:
generate the reproducibility metric based at least in part on the correlation between the first set of parameters and the second set of parameters.

7. The apparatus of claim 6, wherein the instructions to generate the reproducibility metric are executable by the processor to cause the apparatus to:
generate the reproducibility metric based at least in part on a correlation between one or more principal components associated with the training data and one or more principal components associated with the testing data, wherein the first set of parameters comprises the one or more principal components associated with the training data, and wherein the second set of parameters comprises the one or more principal components associated with the testing data.

8. The apparatus of claim 1, wherein the instructions are further executable by the processor to cause the apparatus to:
generate additional training data for the one or more communication environments or the one or more channel environments, or a combination thereof, based at least in part on the reproducibility metric failing to satisfy a threshold value.

9. The apparatus of claim 1, wherein the training data comprises an indication of at least one of a quantity of clusters in the one or more communication environments or the one or more channel environments, or a combination thereof, a quantity of reflectors in the one or more communication environments or the one or more channel environments, or a combination thereof, a quantity of diffraction points in the one or more communication environments or the one or more channel environments, or a combination thereof, positioning information associated with one or more devices of the one or more communication environments or the one or more channel environments, or a combination thereof, an antenna module capability, a quantity of antenna modules, a placement of antenna modules, a beamforming capability of the one or more devices, or a beam measurement capability of the one or more devices.

10. The apparatus of claim 1, wherein the testing data comprises an indication of at least one of a quantity of clusters in the communication environment or channel environment, or both, a quantity of reflectors in the communication environment or channel environment, or both, a quantity of diffraction points in the communication environment or channel environment, or both, positioning information associated with the one or more devices, an antenna module capability, a quantity of antenna modules, a placement of antenna modules, a beamforming capability of the one or more devices, or a beam measurement capability of the one or more devices.

11. The apparatus of claim 1, wherein the machine learning server is part of a user equipment (UE) or part of a network entity, or comprises an independent node associated with a plurality of devices in a network.

12. An apparatus for wireless communications at a first device, comprising:
a processor;
memory coupled with the processor; and
instructions stored in the memory and executable by the processor to cause the apparatus to:
generate a second set of parameters representing testing data, the testing data corresponding to a communication environment or a channel environment, or both, wherein the second set of parameters has a reduced dimensionality with respect to a dimensionality of the testing data;
transmit, to a machine learning server, a first message indicating the second set of parameters representing the testing data; and
receive a second message indicating a reproducibility metric that is based at least in part on a correlation between a first set of parameters and the second set of parameters, wherein the first set of parameters represents training data and has a reduced dimensionality with respect to a dimensionality of the training data, wherein the training data corresponds to one or more communication environments or one or more channel environments, or a combination thereof.

13. The apparatus of claim 12, wherein the reproducibility metric indicates to perform one or more communication procedures according to one or more predictions from a machine learning model generated by the machine learning server using the training data, the reproducibility metric indicating the first device to perform the one or more communication procedures based at least in part on the reproducibility metric satisfying a threshold value.

14. The apparatus of claim 12, wherein the reproducibility metric indicates to perform one or more communication procedures according to one or more measurements performed by the first device, the reproducibility metric indicating the first device to perform the one or more communication procedures based at least in part on the reproducibility metric failing to satisfy a threshold value.

15. The apparatus of claim 12, wherein the reproducibility metric indicates a confidence value associated with predictions from a machine learning model generated by the machine learning server using the training data applied to the communication environment or the channel environment, or both.

16. The apparatus of claim 15, wherein the predictions from the machine learning model generated by the machine learning server associated with the training data include a beam weight prediction for a non-blockage scenario or a blockage scenario.

17. The apparatus of claim 12, wherein the instructions are further executable by the processor to cause the apparatus to:
receive, from a second device within the communication environment or the channel environment, or both, a message indicating one or more parameters, wherein generating the second set of parameters is based at least in part on receiving the message indicating the one or more parameters.

18. The apparatus of claim 12, wherein the instructions are further executable by the processor to cause the apparatus to:
transmit, to a second device within the communication environment or the channel environment, or both, a message indicating the reproducibility metric based at least in part on receiving the reproducibility metric.

19. The apparatus of claim 12, wherein the testing data comprises an indication of at least one of a quantity of clusters in the communication environment or the channel environment, or both, a quantity of reflectors in the communication environment or the channel environment, or both, a quantity of diffraction points in the communication environment or the channel environment, or both, positioning information associated with the first device, an antenna module capability, a quantity of antenna modules, a placement of antenna modules, a beamforming capability of the first device, or a beam measurement capability of the first device.

20. A method for wireless communications at a machine learning server, comprising:
generating a first set of parameters representing training data, the training data corresponding to one or more communication environments or one or more channel environments, or a combination thereof, wherein the first set of parameters has a reduced dimensionality with respect to a dimensionality of the training data;
receiving, from one or more devices, one or more messages indicating a second set of parameters representing testing data, the testing data corresponding to a communication environment or a channel environment, or both, wherein the second set of parameters has a reduced dimensionality with respect to a dimensionality of the testing data; and
transmitting, to the one or more devices, a message indicating a reproducibility metric for the communication environment or the channel environment, or both, the reproducibility metric being based at least in part on a correlation between the first set of parameters and the second set of parameters.

21. The method of claim 20, wherein the reproducibility metric indicates, to the one or more devices, to perform one or more communication procedures according to one or more predictions from a machine learning model generated by the machine learning server using the training data, the reproducibility metric indicating to perform the one or more communication procedures based at least in part on the reproducibility metric satisfying a threshold value.

22. The method of claim 20, wherein the reproducibility metric indicates, to the one or more devices, to perform one or more communication procedures according to one or more measurements performed by the one or more devices, the reproducibility metric indicating to perform the one or more communication procedures based at least in part on the reproducibility metric failing to satisfy a threshold value.

23. The method of claim 20, wherein the reproducibility metric indicates a confidence value associated with predictions from a machine learning model generated by the machine learning server using the training data applied to the communication environment.

24. The method of claim 23, wherein the predictions from the machine learning model generated by the machine learning server associated with the training data include a beam weight prediction for a non-blockage scenario or a blockage scenario.

25. The method of claim 20, further comprising:
generating additional training data for the one or more communication environments or the one or more channel environments, or a combination thereof, based at least in part on the reproducibility metric failing to satisfy a threshold value.

26. A method for wireless communications at a first device, comprising:
generating a second set of parameters representing testing data, the testing data corresponding to a communication environment or a channel environment, or both, wherein the second set of parameters has a reduced dimensionality with respect to a dimensionality of the testing data;
transmitting, to a machine learning server, a first message indicating the second set of parameters representing the testing data; and
receiving a second message indicating a reproducibility metric that is based at least in part on a correlation between a first set of parameters and the second set of parameters, wherein the first set of parameters represents training data and has a reduced dimensionality with respect to a dimensionality of the training data, wherein the training data corresponds to one or more communication environments or one or more channel environments, or a combination thereof.

27. The method of claim 26, wherein the reproducibility metric indicates to perform one or more communication procedures according to one or more predictions from a machine learning model generated by the machine learning server using the training data, the reproducibility metric indicating the first device to perform the one or more communication procedures based at least in part on the reproducibility metric satisfying a threshold value.

28. The method of claim 26, wherein the reproducibility metric indicates to perform one or more communication procedures according to one or more measurements performed by the first device, the reproducibility metric indicating the first device to perform the one or more communication procedures based at least in part on the reproducibility metric failing to satisfy a threshold value.

29. The method of claim 26, further comprising:
receiving, from a second device within the communication environment or the channel environment, or both, a message indicating one or more parameters, wherein generating the second set of parameters is based at least in part on receiving the message indicating the one or more parameters.

30. The method of claim 26, further comprising:
transmitting, to a second device within the communication environment or the channel environment, or both, a message indicating the reproducibility metric based at least in part on receiving the reproducibility metric.

* * * * *